United States Patent
Ur et al.

(10) Patent No.: US 12,217,478 B2
(45) Date of Patent: Feb. 4, 2025

(54) UTILIZING PREDICTION MODELS OF AN ENVIRONMENT

(71) Applicant: SHMUEL UR INNOVATION LTD., Shorashim (IL)

(72) Inventors: Shmuel Ur, Shorashim (IL); Vlad Dabija, Mountain View, CA (US); David Hirshberg, Haifa (IL)

(73) Assignee: SHMUEL UR INNOVATION LTD., Shorashim (IL)

( * ) Notice: Subject to any disclaimer, the term of this patent is extended or adjusted under 35 U.S.C. 154(b) by 155 days.

(21) Appl. No.: 17/807,648

(22) Filed: Jun. 17, 2022

(65) Prior Publication Data
US 2023/0008007 A1   Jan. 12, 2023

Related U.S. Application Data

(60) Continuation of application No. 16/272,655, filed on Feb. 11, 2019, now Pat. No. 11,389,956, which is a division of application No. 15/177,411, filed on Jun. 9, 2016, now Pat. No. 10,245,724.

(51) Int. Cl.
| | |
|---|---|
| *B25J 9/00* | (2006.01) |
| *B25J 9/16* | (2006.01) |
| *G06T 7/12* | (2017.01) |
| *G06T 7/73* | (2017.01) |
| *G06V 10/75* | (2022.01) |
| *G06V 20/10* | (2022.01) |

(52) U.S. Cl.
CPC .......... *G06V 10/751* (2022.01); *B25J 9/1612* (2013.01); *B25J 9/1669* (2013.01); *B25J 9/1697* (2013.01); *G06T 7/12* (2017.01); *G06T 7/75* (2017.01); *G06V 20/10* (2022.01); *G05B 2219/39536* (2013.01); *G05B 2219/40425* (2013.01)

(58) Field of Classification Search
CPC ........ G06V 10/751; G06V 20/10; G06T 7/12; G06T 7/75; B25J 9/1612; B25J 9/1669; B25J 9/1697; G05B 2219/39536; G05B 2219/40425
See application file for complete search history.

(56) References Cited

U.S. PATENT DOCUMENTS

| | | | | |
|---|---|---|---|---|
| 2003/0120714 A1* | 6/2003 | Wolff | ...................... | G06F 18/40 709/200 |
| 2007/0253699 A1* | 11/2007 | Yen | ........................ | G06V 20/10 396/311 |
| 2015/0347846 A1* | 12/2015 | Guzmán-Rivera | .. | G06V 10/774 382/103 |
| 2016/0155235 A1* | 6/2016 | Miyatani | ................. | G06T 7/521 382/103 |
| 2018/0367752 A1* | 12/2018 | Donsbach | ............... | G06F 18/22 |

\* cited by examiner

*Primary Examiner* — Truc M Do

(57) ABSTRACT

A method, system and product for utilizing prediction models of an environment. In one embodiment, using a model of an environment and based on a first scene of the environment, a predicted second scene of the environment is predicted. An observed second scene is obtained and compared to the predicted second scene. Based on the comparison between the predicted second scene and the observed second scene, an action is performed.

21 Claims, 10 Drawing Sheets

UTILIZING PREDICTION MODELS OF AN ENVIRONMENT

CROSS-REFERENCE TO RELATED APPLICATION

This application is a continuation of and claims the benefit of U.S. application Ser. No. 16/272,655, entitled "ENVIRONMENT ANALYSIS USING APPLICATION OF STIMULI", which is a divisional of U.S. Application Ser. No. 15/177,411 filed Jun. 9, 2016, entitled "SYSTEM, METHOD AND PRODUCT FOR UTILIZING PREDICTION MODELS OF AN ENVIRONMENT", now U.S. Pat. No. 10,245,724, all of which are hereby incorporated by reference in their entirety without giving rise to disavowment.

TECHNICAL FIELD

The present disclosure relates to prediction models of environments in general, and in particular to utilizing prediction models to compress information regarding the environment, analyzing the environment, manipulating or otherwise interacting with the environment, or the like.

BACKGROUND

Machine vision is the technology and methods used to provide imaging-based automatic inspection and analysis applications such as automatic inspection, process control, robot guidance in industry, or the like. Machine vision may be used in various industrial and medical applications. Examples include: automatic inspection, industrial robot guidance, electronic component analysis, surface inspection, signature identification, optical character recognition, object recognition, materials inspection, currency inspection, medical image analysis, Automated Train Examiner (ATEx) systems, or the like.

A machine-vision system may employ one or more video cameras, analog-to-digital conversion (ADC), digital signal processing (DSP), other sensors, or the like. The resulting data may be transmitted to a computing device, such as a controller.

Machine vision may use image capture and analysis to automate tasks such as inspection, gauging, counting, or the like. Machine vision systems may use advanced hardware and software components to visually inspect parts to judge the quality of workmanship, perform these functions at higher speeds, reliably, and with greater precision than human inspectors can do.

BRIEF SUMMARY

One exemplary embodiment of the disclosed subject matter is a method, system performing the method or product capable of configuring a system to perform the method. The method comprising obtaining an observed first scene of an environment from one or more sensors, wherein the one or more sensors observe scenes of the environment, wherein the environment comprises one or more physical objects; determining a stimuli force to be applied on the one or more physical objects; applying, using one or more computer-controlled components, the stimuli force to the one or more physical objects of the environment; obtaining an observed second scene of the environment under the stimuli force from the one or more sensors; and performing an action based on the observed first scene and the observed second scene.

Optionally, the observed second scene captures induced movement of objects within the environment produced by the stimuli force.

Optionally, wherein the stimuli force is a vibration force.

Optionally, the vibration force is an ultrasonic vibration force.

Optionally, a frequency of the vibration force is in a range between 10-100 Hertz.

Optionally, a frequency of the vibration force is in a range between 20 KHz-1500 GHz.

Optionally, the observed second scene captures induced vibration of objects within the environment produced by the vibration stimuli force.

Optionally, the one or more sensors comprise at least one of subsonic transducer, sonic transducer and ultrasonic transducer.

Optionally, the one or more sensors comprise a microphone.

Optionally, a frequency of the vibration force is below a sampling frequency of the one or more sensors.

Optionally, a frequency of the vibration force is above a sampling frequency of the one or more sensors, wherein the frequency is correlated with the sampling frequency.

Optionally, the computer-controlled component is a robotic device.

Optionally, the computer-controlled component is a conveyor belt or a vibrating plate.

Optionally, said one or more sensors are one or more cameras, wherein movements or vibration are detectable in pixels associated with the edge of moving or vibrating objects in images captured by the one or more cameras.

Optionally, the one or more physical objects comprise a pile of physical objects.

Optionally, said performed action comprises determining an order of picking up objects from the pile.

Optionally, said performed action comprises picking objects from the pile.

Optionally, said performed action comprises updating a model of the pile.

Optionally, the method comprises determining, based on said comparing, a mechanical coupling between two or more objects of the pile of physical objects that was not modeled in the model of the pile, wherein said updating the model comprises introducing a modeling of the mechanical coupling to the model.

Optionally, the method further comprises selecting the object upon which the stimuli force is to be applied, wherein said selecting comprises selecting the object based on a determination that applying stimuli force on the object is expected to provide information useful for validating or refining the model of the pile.

Optionally, an intensity of the stimuli force is below a maximal threshold, wherein the maximal threshold is an intensity capable of permanently changing a structure of the pile.

Optionally, an intensity of the stimuli force is above a minimal threshold, wherein the minimal threshold is an intensity capable of moving the physical object in a manner detectable by the one or more sensors.

One exemplary embodiment of the disclosed subject matter is a method, system performing the method or product capable of configuring a system to perform the method. The method comprising applying a vibration stimuli on an object, wherein said applying is performed via a computer-controlled component that is capable of applying the vibration stimuli; obtaining a plurality of images of the object, wherein the plurality of images depicting the object from a same viewpoint, wherein at least a portion of the plurality of images are captured during the application of the vibration stimuli; comparing the plurality of images to detect changes occurring in response to the application of the vibration stimuli, which changes are attributed to a change of a location of a boundary of the object; and determining the boundary of the object based on said comparing.

Optionally, the computer-controlled component is a robotic device.

Optionally, the method further comprises performing motion deletion, wherein said performing motion deletion comprises: detecting at least one change in the plurality of images that are attributed to a cause different than the application of the vibration stimuli; and disregarding the at least one change upon performing said determining the boundary of the object.

Optionally, the plurality of images are obtained from a camera, wherein said applying is performed so as the object is vibrated in a manner that is synchronized with a capture timing of the camera; whereby effects of motion occurring irrespective of the vibration stimuli are distinguishable from effects of the vibration stimuli, wherein said determining the boundary is performed based on the effects of the vibration stimuli and disregarding the effects of the motion occurring irrespective of the vibration stimuli.

Optionally, the method further comprising: having an initial model of an environment comprising the object and at least one element, wherein the initial model comprises an initial boundary of the object; wherein said comparing comprises detecting changes occurring in response to the application of the vibration stimuli on the object, which changes are attributed to the at least one element; wherein said determining the boundary of the object comprises expanding the initial boundary to cover the at least one element; and updating the initial model to provide an updated model, wherein the updated model comprises the boundary of the object.

Optionally, said determining the boundary comprises: identifying, in each image of the plurality of images, a contour associated with an estimated boundary of the object, wherein each contour comprising a plurality of contour points; determining the boundary based on an average computation of each point of the plurality of contour points, wherein the average computation of each point is computed based on points in different images of the plurality of images.

Another exemplary embodiment of the disclosed subject matter is a system comprising: one or more sensors, configured to observe scenes of an environment, wherein the environment comprises one or more physical objects; means to apply stimuli force; a computer configured to determine a stimuli force to be applied on the one or more physical objects using said means to apply stimuli force; wherein said computer is further configured to obtain an observed first scene of the environment from said one or more sensors prior to the stimuli force being applied, and an observed second scene of the environment from said one or more sensors under the stimuli force from the one or more sensors; and wherein said computer is further configured to perform an action based on the observed first scene and the observed second scene.

Optionally, the stimuli force is a vibration force.

Optionally, the computer comprising a boundary detection module for detecting, based on the observed first scene and the observed second scene, a boundary of the one or more physical objects.

Optionally, the computer retaining a modeling of the one or more physical objects, wherein the action comprises updating the modeling.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1A shows an illustration of a computerized environment, in accordance with some exemplary embodiments of the disclosed subject matter;

FIGS. 1B-IE show illustrations of images of scenes of an environment observed by a computerized system, in accordance with some exemplary embodiments of the disclosed subject matter;

DETAILED DESCRIPTION

Figure 1A:
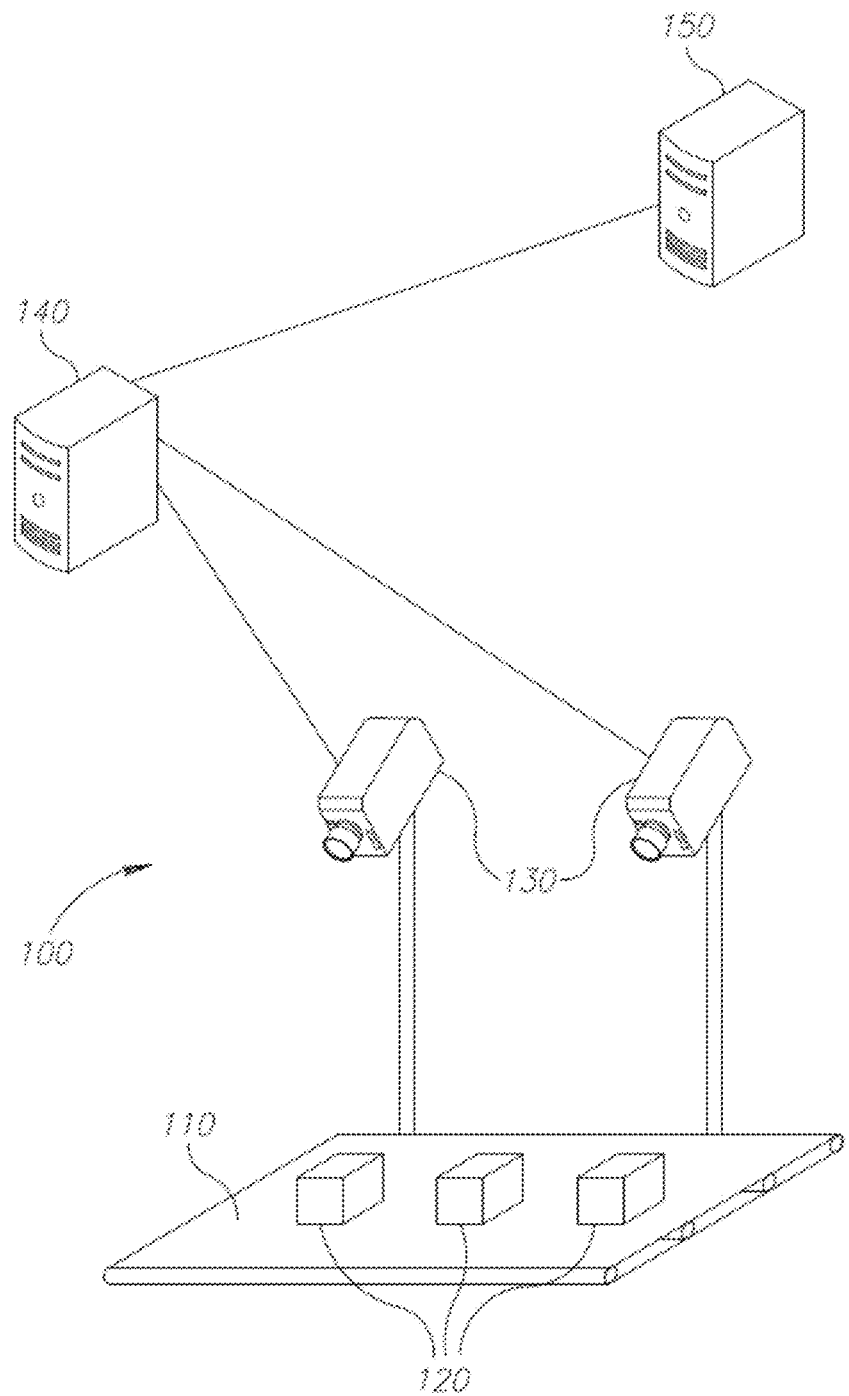

One technical problem dealt with by the disclosed subject matter is to provide for an efficient processing, analysis, storage, or the like of captured scenes of an observed environment. A computerized system may capture scenes of the environment using any sensor, such as but not limited to, a camera, a microphone, ultrasonic transducer, or the like. Based on the captured scenes, actions may be taken, such as performing complex computations, moving robot arms or other moving parts of the computerized system, transmitting the scene to remote locations, storing the captured scene in a data storage or the like.

As an example, the computerized system may be used to guide a moving part of the computerized system, such as a robotic component, into a desired position to perform a designated operation. The computerized system may be designed to perform actions within an environment being observed, based on sensor-based automatic inspection and analysis of the environment, or the like. Additionally or alternatively, the computerized system may be designed to make decisions regarding performing the action. The action may include outputting an output to another system that may perform the action; outputting pass/fail decisions that may invoke trigger mechanisms to reject failed items, to sound alarms or the like; positioning objects within the environment; guiding a robot system to operate within the environment; or the like. One example, may be moving the robotic component so as to change a position of an object in the scene, to mate with an object in the scene, to position a sensor in a desired location, to provide additional information of the environment, or the like. The computation of the movement route of the robotic component may be a complicated computation requiring substantial computation time. However, such computation may be desired to be performed instantly so as to allow for immediate or near-immediate response.

In some exemplary embodiments, the computations may be based on complicated image processing phases, such as filtering, thresholding, pixel counting, segmentation, edge detecting, pattern recognition, comparisons, or the like. Thus, the computations may require a relatively long processing time. Reducing the processing time of such computations may reduce the processing time of performing actions by the computerized environment.

As another example, the computerized system may be configured to transmit or store information regarding the scene.

The computerized system may obtain a large amount of information obtained from various sources, such as sensors that measure the environment in potentially high frequency (e.g., every millisecond, every second, every ten seconds, every minute, or the like) and high quality (e.g., high resolution). Additionally, the rough information obtained from the sensors may be obtained and manipulated to provide derived information. The rough information, the derived information or combination thereof may be stored or transferred. However, the higher the measurement frequency, the better the quality of the sensors, and the higher the number of sensors, the more information the sensors collect, the more information—rough and derived—transferred through communication paths, and the larger bandwidth may be needed and larger storage space that is required to retain the information. Compression of the information may be desired to reduce both storage space and bandwidth.

One technical solution is to perform an action such as processing, analyses, storage, or the like of captured scenes of an observed environment, based on differences between a predicted scene of the environment and an observed scene of the environment.

In some exemplary embodiments, a first scene of the environment may be obtained from one or more sensors observing scenes of the environment. A predicted second scene of the environment may be predicted based on the first scene of the environment. The predicted second scene of the environment may be predicted using a model of the environment. In some exemplary embodiments, the model of the environment may be a prediction model. The prediction model may be configured to predict future scenes of the environment based on a given scene of the environment and based on performance data of the environment. Behavior of the environment may be simulated based on laws of nature, i.e. using physical laws to predict the movement of objects within the environment, such as free fall, collision, or the like. Additionally or alternatively, the prediction model may be a known model of the environment's behavior. As a non-limiting example, the environment may contain a conveyor belt, wherein various information about the conveyor belt such as, its speed, direction, movement pattern, or the like, may be known. The information may be used to predict movement of objects on the conveyor belt. The model may take into account expected movements of a robotic component, which may be known based on instructions that are pre-computed prior to execution by the robotic component, and utilize knowledge of expected movement and expected interaction by the robotic component with the environment in predicting other scenes of the environment. In some exemplary embodiments, the prediction model may be a stochastic model taking into consideration random variation according to some probability distribution. In some exemplary embodiments, the model may be a deterministic model re-producing the same prediction based on the same input, even if the prediction takes into consideration random variations or other non-deterministic behavior.

An observed second scene of the environment may be obtained from the one or more sensors. The predicted second scene and the observed second scene may be compared. An action may be performed based on differences determined between the predicted second scene and the observed second scene.

In some exemplary embodiments, computations may be performed based on the predicted scene of the environment prior to observing a contemporary scene of the environment. When the action is performed, the computations may be utilized, such that the processing time occurring after obtaining the observed second scene may be reduced by relying on the predicted second scene. In some exemplary embodiments, the computations may be computations of an initial plan for performing an action on the environment, such as omitting an output, alerting, changing the environment, a movement plan for a robotic device, or the like. The initial movement plan may be based on the predicted scene of the environment, and planned to be performed on the environment assuming that the predicted scene will occur. In some exemplary embodiments, after an observed scene of the environment is obtained by sensors of the computerized system, the predicted scene and the observed scene may be compared. If the observed scene is determined as identical to the predicted scene, the initial plan may be performed. Additionally or alternatively, if the observed scene is determined to be different than the predicted scene, the initial plan may be adjusted based on the differences between the observed scene and the predicted scene. A modified movement plan may be computed based on the differences.

In some exemplary embodiments, the disclosed subject matter may be utilized to compress scenes of the environment, based on differences between the predicted scene and the observed scene of the environment. In some exemplary embodiments, the observed second scene may be compressed based on the differences between the predicted second scene and the observed second scene. Compressing the observed second scene may create a compressed representation of the observed second scene that may be decompressed based on the first scene of the environment and using a model of the environment, to obtain the observed second scene. In some exemplary embodiments, the same prediction model of the environment used to predict the predicted second scene may be used to predict a predicted scene of the environment during decompression. Using the same prediction model based on the first scene of the environment may produce a scene similar to the predicted second scene. Integrating the differences between the observed second scene and the predicted second scene from the compressed representation of the observed second scene in the predicted scene may yield the observed second scene.

In some exemplary embodiments, the observed second scene may be obtainable from the compressed representation by a separate or same device, which may be capable of performing a prediction, using the model of the environment. The device may have access to the model and utilize the model for decompression.

It will be noted that the observed second scene and the first scene may occur simultaneously, such as by providing a different view of the same environment at the same time. Compression of a first view based on a second view may be used to reduce amount of data to be transferred or stored.

Yet another technical problem dealt with by the disclosed subject matter is to detect boundaries of objects within captured scenes of an environment in a precise manner. Identifying boundaries of an object may be a first stage in estimating the structure and properties of the object in a scene. Boundary detection may be a fundamental tool in image processing and machine vision, particularly in the areas of feature detection and feature extraction. Boundary detection may be used to aid in image segmentation, object detection and recognition, recovery of intrinsic scene properties such as shape, reflectance, illumination, or the like. Boundary of an object may be detected based on analysis of a captured scene and distinguishing one object from another in the scene, such as based on contour maps of the scene, identifying outliers in respect to an object, or the like. As an example, points in an image at which the image brightness changes sharply or has discontinuities may be indicative of a boundary of an object. However, detecting boundaries of an object may be a complicated problem; when the captured scene is of low quality; when the lighting conditions are poor; when the lighting conditions are not uniform; when the object is partially or wholly inside a fluid, syrup, molasses or the like; when the object is in a fogged environment; when the object is partially hidden by other objects; when the background of the object is similar to the object; when the object is non-uniformly colored; or in other similar conditions.

Yet another technical solution is to improve machine vision detection of boundaries of objects by vibrating the desired object and identifying the boundaries by detecting the vibrating pixels in the object comparing with the neighboring pixels.

In some exemplary embodiments, computerized systems may comprise a robotic component. The robotic component may utilize the computerized system abilities to perceive and respond to the environment around the robotic component. Additionally or alternatively, the computerized system may be a machine vision system such as a Vision Guided Robot (VGR) System. A VGR system may be a robot fitted with one or more cameras used as sensors to provide a secondary feedback signal to a robot controller. The robot controller may control the robot to more accurately move to a variable target position.

In some exemplary embodiments, the robotic component may be used to vibrate the desired object. Vibrating an object may cause pixels associated with the object to vibrate in observed scenes of the environment. Accordingly, boundaries of the object may be detected by detecting vibrating pixels associated with the edge of the vibrating object. Information about the object obtained by the computerized system may be combined with the boundary information to provide improved boundary data on the object.

Yet another technical problem dealt with by the disclosed subject matter is to choose an object from a pile using a robotic component, such as a robotic arm. Choosing an object from a pile may be a vision-based task to a robot. In some environments, objects may be placed close together, one on top of the either, stacked on top of each other, scattered in proximity or otherwise in an overlapped manner. In the task of choosing an object from a pile, a robotic arm may be required to pick up an object from the pile. To perform such tasks, a vision-based system may be utilized to identify the object to be picked from the pile. In some exemplary embodiments, it may be desired that the robotic arm move the object without moving or otherwise affecting the other objects in the pile. Such a requirement may complicate the problem, as the system may select objects from the pile iteratively and in each iteration determine which object can be picked without affecting the other objects remaining in the pile.

In some exemplary embodiments, visual input may be utilized to solve the problem of selecting the object from a pile, such as based on a two dimensional image of the environment containing the pile of objects, a three dimensional image of the environment containing the pile of objects, several images of the environment, or the like. However, such a solution may be limited because of limitation of the visual sensing system accompanying the robotic component handling the problem, such as vision limitations, sensitivity of the sensors, resolution, or the like. For example, the ability of a machine vision system to see in dim light or to detect weak impulses at invisible wavelengths may be limited. Further, the extent to which a machine vision system can differentiate between objects may also be different due to sensors limitations.

Yet another technical solution is applying a stimuli force on an object from the pile of physical objects, such as a gentle vibration. The stimuli force may be kept low enough so as not to change the structure of the pile of objects, but strong enough to move at least one object in a manner detectable by sensors of the computerized system. The stimuli force applied on the object may produce a gentle movement of the object. The gentle movement of the object may help automatically detecting hidden surfaces of the object, mechanical coupling between the object and other objects in the pile, or the like. Accordingly, an order of choosing objects from the pile may be determined. In some exemplary embodiments, the vibration may be performed in a frequency that is detectable by the sensors of the system, such as in a frequency below the sample frequency of the sensors.

In some exemplary embodiments, the problem of choosing an object from a pile may be solved based on an observed scene of the environment. Such as for example, given a pile consisting of three objects, where the second and third objects are located on the top of the first object; a naïve selection may be to initially pick up the second object, then the third object, and then the first object. However, the pile may comprise inner connections that may not appear in the observed scene; such as for example, the first and the second objects may be glued together, connected by screws, or the like. In case such information is known, the selected object to be picked up may be different than the second object (e.g., initially pick up the third object). According to one exemplary embodiment, a robotic component may apply a stimuli force on the second object from the top. In case the robotic component vibrates on the edge of the second object, with respect to axis y, while the first and the second objects are not adhered; the opposite edge of the second objects may rotate at axis z, while the first object may be relatively static. However, in case the first and the second objects are connected, the first object may vibrate in z axis with the second object. The observed second scene of the environment may demonstrate the connection between the first and the second objects according to the influence of the stimuli force that may be understood by comparing the observed second scene with the predicted second scene. For example, if the first and the second objects are not connected, the friction between the first and the second objects may dominate the reading in the observed second scene, and in a common case, the vibration on a single object may have a low influence on the other objects, that will vibrate in a relatively low vibration amplitude. If the first and the second objects are connected, the same vibration amplitude may be measured on the first object and on the second object.

One technical effect of the disclosed subject matter is to reduce the processing time of actions being performed in the computerized system. Performing computations based on predicted scene of the environment, prior to obtaining an observed scene of the environment, and utilizing the computations after obtaining the observed scene of the environment, may reduce the processing time occurring after obtaining the observed scene.

Another technical effect of the disclosed subject matter is efficient storage and transmission of data. An uncompressed video, for example, may produce an enormous amount of data. Even with powerful computer systems (storage, processor power, network bandwidth), such data amount may cause extreme high computational demands for managing the data. Compression according to the disclosed subject matter may be relatively low computational complexity for both compression and decompression. In some exemplary embodiments, such compression may be useful for real-time applications with low bandwidth requirements.

Yet another technical effect of the disclosed subject matter is to allow for automating of the task of choosing an object from a pile. Such a solution may improve capabilities of robotic-based systems and potentially reduce required manual assistance in the operation of such systems.

Referring now to FIG. 1A showing a schematic illustration of a computerized environment, in accordance with some exemplary embodiments of the disclosed subject matter.

In some exemplary embodiments, an Environment 100 may be observed by a computerized system. Environment 100 may comprise a Conveyor Belt 110. Conveyor Belt 110 may be a part of a production line. Conveyor Belt 110 may move in a predetermined movement pattern. Information regarding the movement pattern of Conveyor Belt 110 may be known to the computerized system, such as velocity of the conveyor belt, movement direction, orientation, or the like. Objects 120 may be positioned on Conveyor Belt 110. Objects 120 may be any object, such as but not limited to components used for assembling a final product, the final product itself, or the like.

In some exemplary embodiments. Sensors 130 may observe scenes of Environment 100. Sensors 130 may be digital cameras, video cameras, ultrasonic sensors, laser sensors, LED sensors, infra-red sensors, contact image sensors combination thereof, or the like. In some exemplary embodiments, Sensors 130 may be movable sensors that are controlled by the computerized system, by a human operator, or the like. Additionally or alternatively, a first portion of Sensors 130 may observe a first part of Environment 100 and a second portion of Sensors 130 may observe a second part of Environment 100. In some exemplary embodiments. Sensors 130 may be located alongside Conveyor Belt 110, such as Objects 120 may pass through the viewing angle of each of Sensors 130 when Conveyor Belt 110 is operating.

In some exemplary embodiments, Sensors 130 may be located in different locations of Environment 100. Different sensors of Sensors 130 may observe different parts of Environment 100. Additionally or alternatively. Sensors 130 may be moveable sensors that may observe different parts of Environment 100 from different locations.

In some exemplary embodiments, Sensors 130 may be connected to a Computing Device 140, such as a server, a personal computer, a mobile device, or the like. Computing Device 140 may obtain scenes of Environment 100 from Sensors 130. In some exemplary embodiments, Computing Device 140 may perform analysis based on the scenes, may generate instructions to a robotic component (not shown), or the like. Computing Device 140 may be configured to compare scenes of Environment 100, process scenes of Environment 100, compress scenes of Environment 100, or the like.

In some exemplary embodiments, Computing Device 140 may transmit the scenes to another computing device, Device 150, which may be connected thereto via a direct connection, a, such as for example, the Internet, a Local Area Network (LAN), a Wide Area Network (WAN), an intranet, a wireless network, the Internet or the like. In some exemplary embodiments, Computing Device 140 may transmit a compressed version of the observed scenes which may be received by Device 150 and optionally decompressed by Device 150.

Referring now to FIGS. 1B-1E showing schematic illustrations of scenes of an environment illustrated in FIG. 1A, as observed by a computerized system, in accordance with some exemplary embodiments of the disclosed subject matter.

Figure 1B:
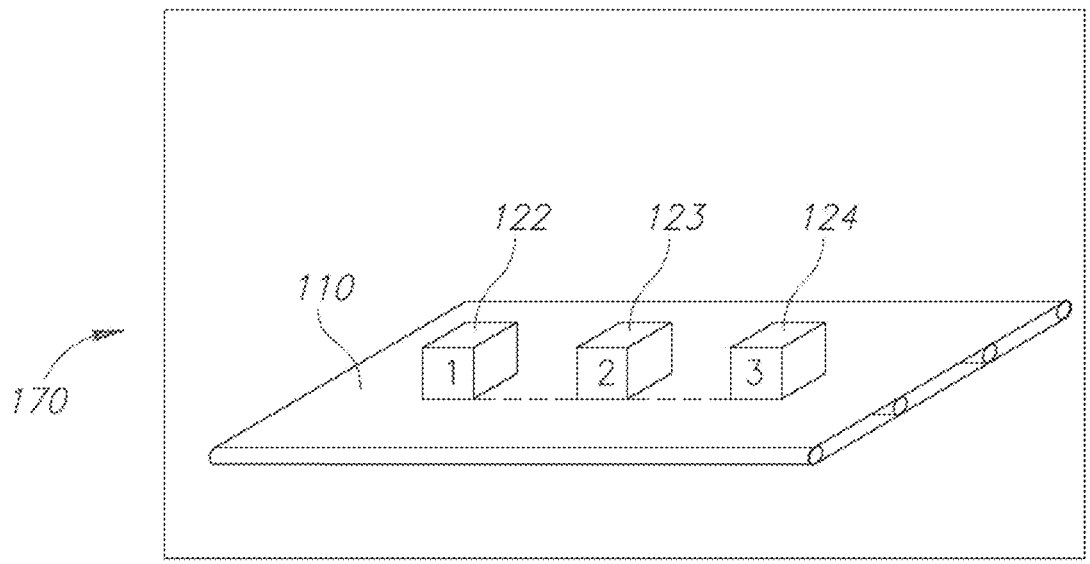

In FIG. 1B, a First Scene 170 of Environment 100 may be obtained from Sensors 130. A Conveyor Belt 110, an Object 122 (denoted "1"), an Object 123 (denoted "2") and an Object 124 (denoted "3") may be demonstrated in First Scene 170, as is depicted in FIG. 1B. Object 122, Object 123 and Object 124 may represent Objects 120 on Conveyor Belt 110 during the time First Scene 170 was captured by the sensor.

Figure 1C:
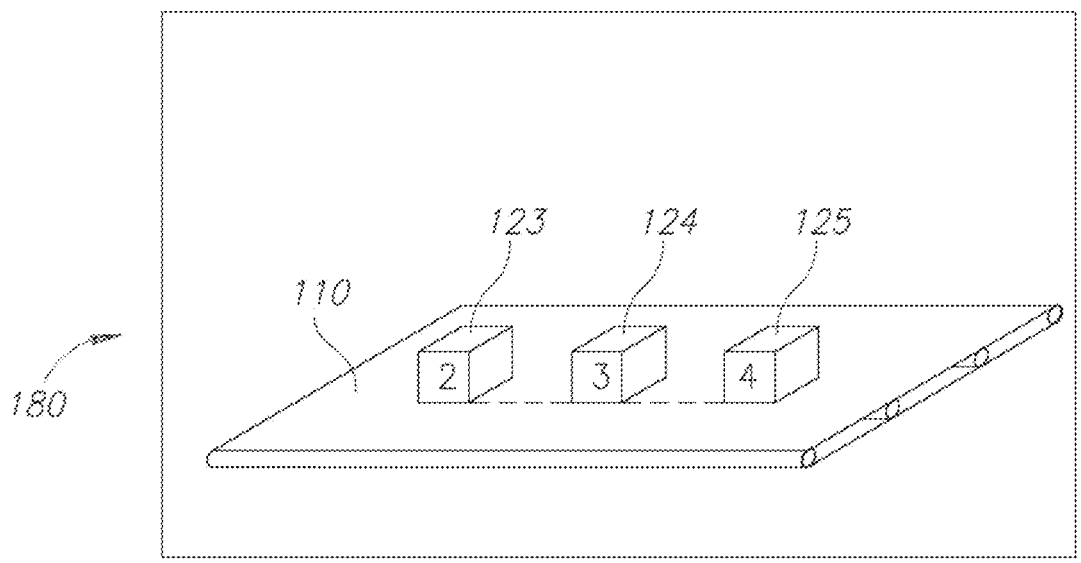

Referring now to FIG. 1C, showing a Predicted Second Scene 180 of Environment 100. Predicted Second Scene 180 may be predicted by Computing Device 140. Predicted Second Scene 180 may be predicted based on First Scene 170. Predicted Second Scene 180 may be predicted using a model of Environment 100, such as for example the movement pattern of Conveyor Belt 110, the activity of the production line which Conveyor Belt 110 is part of, the kind and shape of Objects 120 moving on Conveyor Belt 110, distance between Objects 120, or the like.

Predicted Second Scene 180 may illustrate how Environment 100 is expected to appear in a second time, according to how Environment 100 appeared previously at a first time (e.g., as depicted by First Scene 170), and based on how items in Environment 100 are expected to move. In some exemplary embodiments, Objects 120 may be predicted to move on Conveyor Belt 110 from its right side to its left side. Accordingly, the left-most object appearing in First Scene 170, (Object 122), may be predicted to be out of frame of the scene at the second time. Therefore, Predicted Second Scene 180 may not include Object 122. Additionally or alternatively, Object 123 and Object 124 may be predicted to move to the left side of Conveyor Belt 110, in comparison to their location as observed in First Scene 170, keeping the same distance therebetween as observed in First Scene 170. A new object, Object 125 (denoted "4") may be predicted to enter the frame of the scene of Environment 100, on the right side of Conveyor Belt 110, with the same general positioning as of Objects 122, 123, and 124 in First Scene 170, with distance from Object 124 similar to the distance between Object 123 and Object 124 in First Scene 170.

It will be noted that the prediction may be based on some modeling of the environment which may be used to derive any prediction based on how the environment is expected to be behave over time. In some cases, the prediction may be that the new object may be different than observed objects, the distance to the new object may be different than distances between observed objects (e.g., a short distance may be expected after a long distance is observed), orientation may be predicted to be different, or the like. In some exemplary embodiments, the model of the environment may comprise information regarding expected movement of objects, such as velocity, acceleration, direction, or the like. Additionally or alternatively, the model may not include such information and such information may be derived from a multiple of previously obtained scenes. For example, in case a belt speed of Conveyor Belt 110 is unknown and is not part of the model, such information may be derived from obtaining two or more previous scenes occurring at different times to determine the belt speed, velocity of Objects 120, acceleration of Objects 120, or the like. In some exemplary embodiments, the prediction may further be based on multiple obtained scenes, such as for example, in case information available in a first previous scene is no longer available in First Scene 170. For example, appearance of Object 123 may not be obtainable from First Scene 170 due to lighting conditions, casted shadows, blocked view, or the like. The appearance of Object 123 may be obtainable from a previous observed scene of Environment 100, such as a scene in which Object 123 is located at the location of Object 124 in First Scene 170. Additionally or alternatively, the prediction may be based on a plurality of obtained scenes obtained at the same time, such as scenes of Environment 100 observed from different viewpoints, which may be used to complete information not obtainable from First Scene 170 but is obtainable from a different viewpoint.

Additionally or alternatively, multiple predicted second scenes may be predicted based on First Scene 170. In some exemplary embodiments, different prediction models may be used, each to provide a different predicted scene. As an example, assuming Conveyor Belt 110 may maintain its belt speed, a first prediction model may be used to predict how Objects 120 are expected to move. A second prediction model may be used to predict how Objects 120 are expected to move in case the belt speed is reduced. As another example, in case there is a junction in Conveyor Belt 110, Object 122 may be predicted to either continue on a first route of the junction or on a second route. A first prediction model may be used to predict the outcome of continuing in the first route and a second prediction model may be used to predict the outcome of continuing in the second route.

Figure 1D:
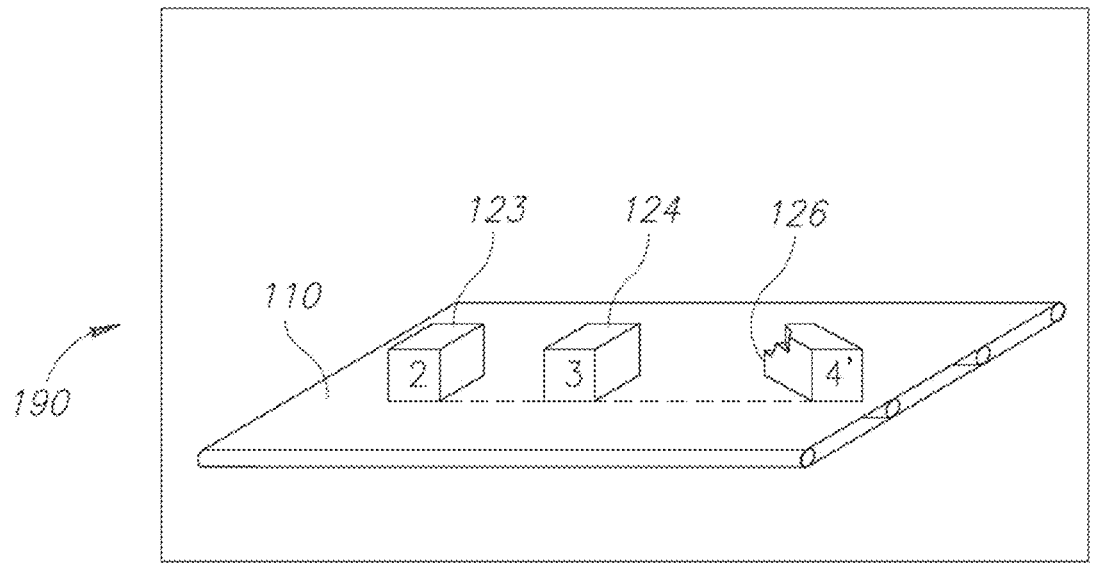

Referring now to FIG. 1D, an Observed Second Scene 190 may be obtained from Sensors 130. In some exemplary embodiments, Observed Second Scene 190 may occur later in time than First Scene 170. Conveyor Belt 110, Object 123, Object 124 and a new Object 126 may be demonstrated in Observed Second Scene 190. Object 123, Object 124 and Object 126 may represent Objects 120 on Conveyor Belt 110 during the time Observed Second Scene 190 was captured by the sensor.

In some exemplary embodiments, Predicted Second Scene 180 and Observed Second Scene 190 may be compared. Differences between Predicted Second Scene 180 and Observed Second Scene may be identified. As an example and as can be appreciated from FIGS. 1C and 1D, the distance between Object 126 and Object 124 in Observed Second Scene 190 is larger than the predicted distance between Object 125 and Object 124 in Predicted Second Scene 180. Another difference may be the shape of Object 126 comparing with the predicted shape of Object 125 in Predicted Second Scene 180. Yet another difference may be the orientation of Object 126 in Observed Second Scene 190 which is titled to the left comparing with Object 125 in Predicted Second Scene 180 which is perpendicular to Conveyor Belt 110.

The differences may occur due to mistakes or inaccuracy of prediction of Predicted Second Scene 180. Additionally or alternatively, the differences may occur due to an unexpected incident in Environment 100, such as a defect in the production line Conveyor Belt 110 is part of, a defect in the production of Object 126, a change in the movement pattern of Conveyor Belt 110, or the like. Additionally or alternatively, the differences may occur as a result of stochastic behavior of Environment 100. Additionally or alternatively, the differences may occur in view of the model providing prediction under partial information of the environment (e.g., information obtainable from the observed scene or potentially a set of previously observed scenes). However, it will be noted that the disclosed subject matter is not limited to any particular reason causing the differences between observed and predicted scenes.

Figure 1E:
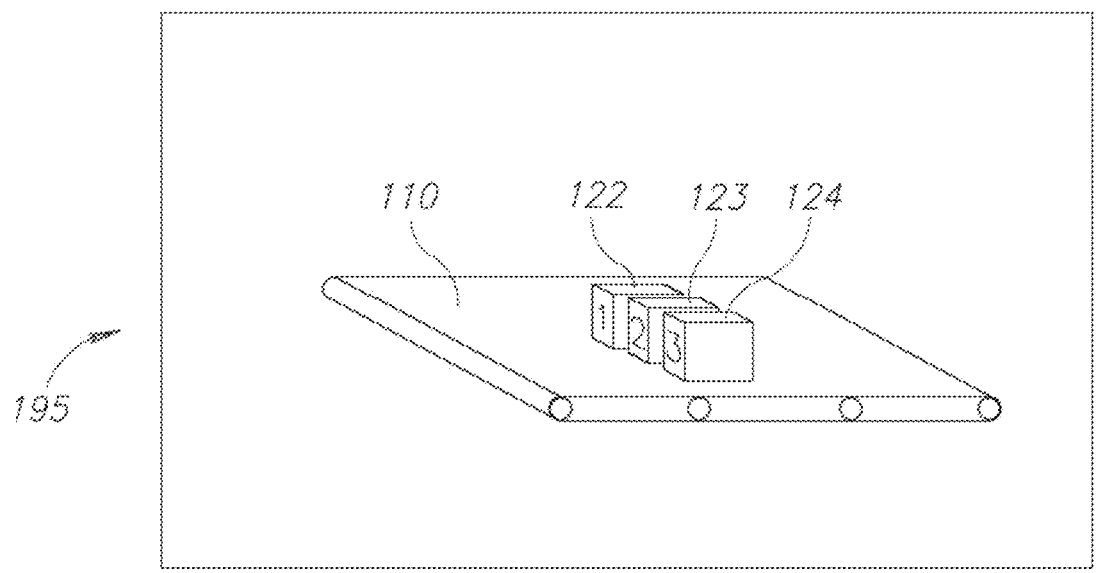

Referring now to FIG. 1E, showing a Predicted Third Scene 195. Predicted Third Scene 195 may be a scene capturing Environment 100 at the same time First Scene 170 is captured but from a different view. As an example, First Scene 170 may be observed by a camera having a first position (e.g., location and angle). Predicted Third Scene 195 may depict Environment 100 at the same time from a different view, such as corresponding to a second camera having a second position. In some exemplary embodiments, First Scene 170 may be obtained from a first subset of Sensors 130, and an observed third scene may be obtained from a second subset of Sensors 130, different than the first subset. Scenes of Environment 100 observed by the first subset of Sensors 130 and scenes of Environment 100 observed by the second subset of Sensors 130 may demonstrate different views of Environment 100. For example, the first subset of Sensors 130 may observe scenes demonstrating a top view of Conveyor Belt 110, showing the top of Objects 120, while the second sunset of Sensors 130 may demonstrate a side view of Conveyor Belt 110, showing objects that enter Conveyor Belt 110 from one side. Additionally or alternatively, the first subset and the second subset of Sensors 130 may observe different areas within Environment 100. Such as for example, the first subset of Sensors 130 may observe Objects 120 while located on Conveyor Belt 110 and the second subset of Sensors 130 may observe Objects 120 when leaving Conveyor Belt 110.

In some exemplary embodiments, Predicted Third Scene 195 may be compared with observed scene (not shown), such as a scene observed by the second camera. In some cases, some information is depicted in First Scene 170, such as texture, color, or similar properties of portions of objects, such as a top face of Object 122, and may be used to derive a different view of the same top face in Predicted Third Scene 195. In some cases, some information may not be observable, such as hidden from view in First Scene 170 and may be predicted using the prediction model. For example, in some cases, geometry, texture, color and similar characteristics of objects may be predicted to be consistent. In some cases, shades can be observed in First Scene 170 and used to predict brightness of hidden portions, which are visible in Predicted Third Scene 195.

In some exemplary embodiments, a plurality of predicted scenes may be predicted based on First Scene 170. In some exemplary embodiments, a chain of successive scenes may be predicted, such as predicting the environment over a time span. Each predicted scene in the chain may be used as input for the prediction of its successive scene. Additionally or alternatively, for each point in time within the time span, a plurality of scenes may be predicted. In some exemplary embodiments, the plurality of scenes may comprise scenes that are alternative to one another.

In some exemplary embodiments, based on First Scene 170 a tree of predicted scenes may be determined. The tree may comprise First Scene 170 as a root node. For each node in the tree, one or more successive nodes may represent one or more alternative predicted next scenes. Upon obtaining an observed next scene (e.g., Observed Second Scene 190), all subtrees that are rooted at level 2 (e.g., having a root node being an immediate child node of the root node of the tree) may be processed. A subtree having a root node identical to the observed next scene may be used for future predictions and the subtree may be used as the tree in a next iteration. In case the root nodes of all level 2 subtrees do not match the observed next scene, a best match node may be selected out of the root nodes based on a similarity metric. The best matched root node may be used as a basis for computations or actions as in accordance with the disclosed subject matter. In some exemplary embodiments, the subtree of the best matched root node may be used as the new tree for future processing. In some exemplary embodiments, the subtree may be re-computed altogether or updated based on the differences between the best matched root node and the observed next scene. In some exemplary embodiments, the re-computations or updates may be performed for each level of the subtree independently such that some nodes may be re-computed without taking into consideration the previously computed predictions and some nodes may be updated. In some exemplary embodiments, a node may be updated in case there is a similarity measurement above a predetermined threshold. As an example, consider two scenes that are identical in 95% of the pixels, where the 5% of non-identical pixels are grouped together. In such a case, the prediction of a next scene may be updated by taking into account the different values of the non-identical pixels. In such a case, one may expect to receive a prediction that is similar to the previous prediction in at least about 90% of the pixels. In some exemplary embodiments, instead of re-computing or updating the nodes, a subtree having a node identical to the observed next scene and being rooted at a different level than level 2, may be located within the tree and used as is.

In some exemplary embodiments, an action may be performed by Computing Device 140 based on the differences identified between Predicted Second Scene 180 and Observed Second Scene 190. In some exemplary embodiments, Observed Second Scene 190 may be compressed based on the differences. Additionally or alternatively, a computation performed based on Predicted Second Scene 180 may be modified or determined to be used as is, depending on the identified differences. For example, a movement path of a robotic component may be pre-computed based on Predicted Second Scene 180. Such pre-computation may be performed before the second scene occurs in time. The pre-computed movement path may be adjusted based on differences identified in Observed Second Scene 190 when compared to Predicted Second Scene 180. Additionally or alternatively, in case the differences affect the movement path, the movement path may be re-computed based on Observed Second Scene 190 without utilizing the pre-computed movement path. Additionally or alternatively, in case the differences are determined as not to affect the movement path, the pre-computed movement path may be used as is.

In some exemplary embodiments, Computing Device 140 may perform computations based on Predicted Second Scene 180 prior to obtaining Observed Second Scene 190. Performing the computations by relying on Predicted Second Scene 190 may reduce the processing time occurring after observing the scene needed for the action to be performed. In some exemplary embodiments, the computations may be computations of an initial movement plan of a robotic component. The initial movement plan may be computed based on Predicted Second Scene 180. For example, the initial movement plan may be a movement plan of a robotic component that adds materials to Objects 120 when arriving to the right side of Conveyor Belt 110. The computations may be based on the expected movement speed of the robotic component, of Objects 120, of Conveyor Belt 110, or the like. The computations may take into account expected time that Objects 120 stay at a specific position on Conveyor Belt 110, location of new objects on Conveyor Belt 110, desired relative positioning between the robotic component and an object which is subject to the operation of the robotic component, or the like. After obtaining Observed Second Scene 190 and determining the differences compared to Predicted Second Scene 180, the initial movement plan may be adjusted to compute a modified movement plan based on the differences. Referring again to the above mentioned example, the movement plan of the robotic component may be adjusted based on the differences in the location and tilt of Object 126 in Observed Second Scene 190 in comparison to the predicted positioning of Object 125 in Predicted Second Scene 180. Adjusting the initial movement plan that occurs after obtaining Observed Second Scene 190 and comparing the scenes may require further computations and processing time. However, as the computation may utilize some of the pre-computed initial movement plan, the response time after obtaining Observed Second Scene 190 may be shorter than if the movement plan is computed based solely on Observed Second Scene 190. In some exemplary embodiments, response time may be almost instantaneously in case the pre-computed initial movement plan is used as is without modifications. In some exemplary embodiments, the comparison and potential adjustment of the pre-computations may be performed in parallel to performing the computations based on the Observed Second Scene 190. As a result, in case direct re-computation can be performed faster than comparison and adjustment, the response time may not be increased in view of the pre-computation and potential usage thereof.

It will be noted that in some exemplary embodiments, computations of a movement plan may require more resources, such as processing time, than identifying differences between two scenes. The disclosed subject matter may be similarly applied on any complex computation that can be pre-computed based on a predicted scene. As another non-limiting example, a determination as to an amount of liquid to be added to a mix may depend on the level of the mix. The computation may be complex and be computed in advance based on a prediction of the level of the mix.

In some exemplary embodiments, the speculative computation may require more resources than comparing or identifying the two scenes, as the comparison may be performed with respect to a partial, and potentially minimal, amount of data. For example, consider a prediction of a movement of a ball in the air. The prediction may predict based on a plurality of previous frames, and accounting effects of gravity and friction, how the ball is expected to continue moving in a next frame. After a next frame is obtained, determining whether the prediction was correct may be performed by checking the predicting image in few places or pixels, and not by comparing each and every pixel of the next frame with the predicted frame. In some exemplary embodiments, as the ball may be known to be rigid, pixels of a portion of the perimeter of the ball may be examined, to ensure the perimeter appears in the predicted location. Such a check may be sufficient to ensure, based on the fact that a small portion of the ball is at the expected location, the entire ball is in the predicted location. Similarly, computing a transformation of the predicted ball with the ball observed in the predicted frame may be performed and utilized to modify speculative computations, such as the initial movement plan. Additionally or alternatively, the action may be creating a compressed representation of Observed Second Scene 190. The compressed representation may be created by Computing Device 140. The compressed representation may be created based on the differences between the predicted second scene and the observed second scene. Computing Device 140 may transmit the compressed representation and First Scene 170 to Computing Device 150. Computing Device 150 may be capable of uncompressing the compressed representation to obtain Observed Second Scene 190, by performing a prediction using the model of Environment 100 and based on First Scene 170. In some exemplary embodiments. Computing Device 150 may utilize the model to predict Predicted Second Scene 180 and modify such predicted scene using the compressed representation, such as indicating which pixels, polygons, or portions of Predicted Second Scene 180 to include as is and which portions to modify in order to obtain Observed Second Scene 190.

Figure 2:
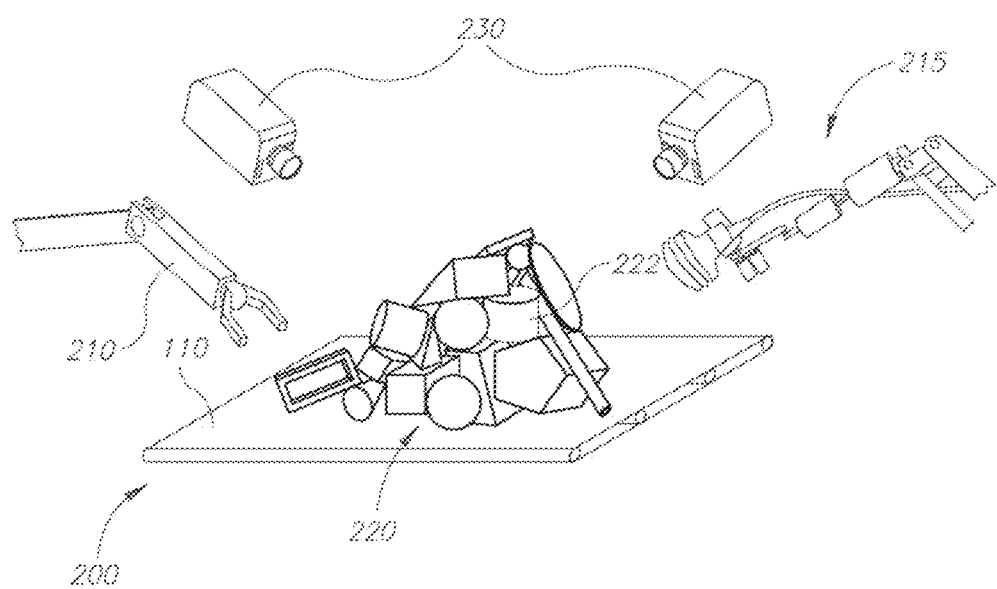
FIG. 2 shows an illustration of a computerized system, in accordance with some exemplary embodiments of the disclosed subject matter.

Referring now to FIG. 2 showing an illustration of a computerized system, in accordance with some exemplary embodiments of the disclosed subject matter.

An Environment 200 may be observed by Sensors 230. Environment 200 may comprise a Robotic Arm 210. Robotic Arm 210 may be automatically controlled to move any number degrees of freedom, such as one, two, three, four, five or six degrees of freedom. Robotic Arm 210 may be controlled by a computing device, such as 140 in FIG. 1A.

In some exemplary embodiments, Environment 200 may comprise a Pile of Objects 220. Pile of Objects 220 may comprise plurality of physical objects. The physical objects may be placed close together, one on top of the other, or the like. A composition of Pile 220 may depend on the properties of the physical objects. In some exemplary embodiments, Robotic Arm 210 may be utilized to interact with Pile 220 such as for counting the physical objects, picking up some or all of the objects, arranging the physical objects, sorting the physical objects, or the like.

In some exemplary embodiments, a first scene of Environment 200 may be obtained from Sensors 230, similar to First Scene 170 of Environment 100 in FIG. 1B. In some exemplary embodiments, a stimuli force may be determined to be applied on a target object from Pile 220. In some exemplary embodiments, the determined stimuli force may be a repetitive force, such as aimed at vibrating an object without changing its position after the stimuli force is ceased. In some cases, minor movements, such as by an inch, millimeters, microns, or the like, may not be considered as the object changing its position. Additionally or alternatively, any movement that would not change the position by more than about 0.1% pixels in a scene, could be seen as not changing the position of the object. Additionally or alternatively, the stimuli force may be a force that causes movement of a target object. The target object may be selected based on the first scene and a model of Pile 220. In some exemplary embodiments, the target object may be an object that is being investigated, such as by attempting to discover its shape, relationship with other objects in Pile 220, or the like. In some exemplary embodiments, the target object may be the least connected physical object in Pile 220, for example, based on the model of Pile 220.

The model of Pile 220 may model the different objects of Pile 220, as inferred by the computerized system, such as based on the first scene and potentially based on additional information available thereto. The determined stimuli may be aimed at assisting in improving the model of Pile 220 by interacting with an object and observing outcomes of such interactions. Based on such observation, information may be derived about the location of the physical objects in Pile 220. The information may comprise information regarding hidden surface objects contacts, mechanical coupling between the physical objects in Pile 220, or the like. In some exemplary embodiments, the model may be used as a hypothesis and the stimuli may be aimed at disputing or validating the hypothesis.

In some exemplary embodiments, the intensity of the stimuli force may be below a maximal threshold. The maximal threshold may be an intensity capable of changing a structure of Pile 220. Additionally or alternatively, the intensity of the stimuli force may be above a minimal threshold. The minimal threshold may be an intensity capable of moving the physical object in Pile 220 in a manner detectable by Sensors 230. In some exemplary embodiments, the stimuli force may be a vibration force, that is configured to provide a vibration in a frequency that is detectable by Sensors 230 (e.g., below a threshold frequency).

In some exemplary embodiments, the stimuli force may be a vibration force. The vibration may be applied in different directions to estimate the mechanical coupling between the physical objects in each direction. An induced vibration of other physical objects other than the target object may occur as a result of the stimuli force. An intensity of the induced vibration in all other physical objects may be measured. The induced vibration may be measured by any sensor, including but not limited to sensors mounted on Robotic Arm 210, or by other moveable sensors that are positioned so as to touch other physical object in Pile 220, such as Additional Robotic Arm 215. In some exemplary embodiments, contactless sensors may be used, such as capable of sensing vibrations without touching a target object but rather being in the proximity thereof. In some exemplary embodiments, the contactless sensor may be positioned within microns, mms, of the object, or the like. The contactless sensor may capture vibration via air coupling. Additionally or alternatively, the sensor may collect vibration data by touching the object in a single contact point or in area containing multiple points of contact. Additionally or alternatively, the vibration data may be collected by several sensors located on several moving components, touching the object in different contact points.

In some exemplary embodiment, the vibration may be applied by a plurality of movable components such as Robotic Arm 210 and Additional Robotic Arm 215. The movable components may be utilized to apply plurality of vibration forces on the object, in different powers, directions, locations or the like. Plurality of sensors mounted on the plurality of movable components may be configured to sense the induced vibration of the object they touch. A signal processing technique, such as but not limited to beamforming, may be used to combine signals from the plurality of sensors and transmitting a combined vibration signal.

Additionally or alternatively, the vibration data may be collected in other manners, such as simultaneous sensing or sequential sensing. Simultaneous sensing may comprise applying the vibration stimuli on a selected object and sensing the reflected vibration of the selected object simultaneously. Simultaneous sensing may comprise having a sensor touch the selected object while the vibration stimuli being applied, or applying the stimuli force and sensing the reflected vibration by the same sensor. In some exemplary embodiments, a first transducer of the sensor may be configured to transmit an ultrasonic signal to the selected object, while a second transducer of the sensor may be configured to receive a reflected signal simultaneously from the selected object. The reflected signal may be processed using signal processing methods such as but not limited to beamforming, to separate one or more vibration waves coming from different directions. Sequential sensing may comprise sequentially collecting information from a single location by sequentially analyzing results of applying vibration stimuli. Sequential sensing may comprise applying the vibration stimuli on the selected object, such as by transmitting a signal to the selected object; and then sensing back reflections from the selected object. In some exemplary embodiments, the sensor of sequential sensing may transmit a signal to the selected object and then switch to a receive mode in order to sense the back reflection from the selected object, and so forth to create a sequence of back reflections, each after transmitting a signal to the selected object.

In some exemplary embodiments, the sensor may be mounted on a movable component within Environment 200, such as Robotic Arm 210, Additional Robotic Arm 215, or any other movable elements that are positioned so as to touch physical objects in Pile 220. Additional Robotic Arm 215 may be automatically controlled to move any number degrees of freedom, such as one, two, three, four, five or six degrees of freedom. Robotic Arm 210 may be controlled by a computing device, such as 140 in FIG. 1A. In some exemplary embodiments, the same movable component may be used both for applying the vibration force and sensing the induced vibration, such as by sensors located thereon. Additionally or alternatively, different moveable components may be used for applying the vibration and sensing.

In some exemplary embodiments, the sensor may comprise a transducer. The transducer may sense the vibration on Object 222 or other objects in Pile 220, and transmit the vibration signals to the computing device, to the computerized system or to any other control system of Environment 200. In some exemplary embodiments, the transducer may convert the vibration signals to another form of energy, such as but not limited to electrical signals, magnetic signals, voltage, or the like, that may be processed, analyzed and transmitted.

In some exemplary embodiments, different functional parts of the transducer, such as a receiver of the vibration signals and a transmitter of the signal, may be located in different movable components, such as for example, the receiver may be located on Robotic Arm 210 while the transmitter may be located on Additional Robotic Arm 215.

In some exemplary embodiments, the sensor may scan the induced vibration by touching the object via electronical scanning such as beamforming, mechanical scanning, or the like. The sensor may be utilized to touch physical objects in Pile 220 and measure the induced vibration of each object. In some exemplary embodiments, the sensor may touch the object in a single contact point, apply a vibration force on the object via the single contact point and then measure the induced vibration of the object. Additionally or alternatively, the sensor may touch the object in several contact points simultaneously, apply the vibration force via the several contact points and then measuring the induced vibration of the object.

In some exemplary embodiments, a predicted second scene of Environment 200 may be predicted based on the first scene and using the model of Pile 220, similar to Predicted Second Scene 180 in FIG. 1C. The predicted second scene may illustrate how Pile 220 is expected to appear in response to applying the stimuli force. The predicted second scene may predict how Pile 220 is expected to appear, according to how Pile 220 appeared in the first scene, and based on how items in Environment 200 are expected to move, in response to applying the stimuli force. In some exemplary embodiments, the target object may be predicted to move in response to applying the stimuli force. Additionally or alternatively, more physical objects in Pile 220 may be predicted to move in response to applying the stimuli force on the selected object. In some exemplary embodiments, predicted second scene may be predicted based on a model of Pile 220. For example, based on an assumption that the target object is connected to a first object and not directly or indirectly connected to a second object, it may be predicted that the stimuli would cause the first object to move and not cause the second object to change its position at all. In some cases, vibrating the target object would be expected to cause vibration of objects connected thereto, directly or indirectly, during the application of the stimuli. The vibration pattern may be affected by the relationship between the objects in Pile 220 and the outcome may be predicted based on such model.

In some exemplary embodiments, Robotic Arm 210 may apply the stimuli force on the target object. Additionally or alternatively, the stimuli force may be applied on Pile of Objects 220 by another elements in Environment 200 other than a robotic component. As a non-limiting example, Pile of Objects 220 may be positioned on a conveyor belt, such as Conveyor Belt 172 in FIG. 1B. In this case, the stimuli force may be applied by accelerating or decelerating the speed of the conveyor belt. As another non-limiting examples, the stimuli force may be applied by a vibrating plate Pile of Objects 220 may be positioned over, by blowing a wind over Pile of Objects 220, another robotic system, other parts of Environment 200, or the like. In some exemplary embodiments, a precise and accurate force may be desired and utilized to be selectively applied on the target Object.

In some exemplary embodiments, Robotic Arm 210 may comprise sensors useful for sensing vibrations and providing potentially high-definition information regarding the effects of the application of the stimuli on the target object. Robotic Arm 210 may be used to sense induced vibration of the physical objects by touching the physical objects. Additionally or alternatively, other robotic devices similar to Robotic Arm 210 may be used. Piezoelectric actuation and sensing capabilities of the other robotic arms may cause the vibration frequency induced by the stimuli force to be higher.

In some exemplary embodiments, an observed second scene of Environment 200 may be obtained from Sensors 230 or any other sensor of the computerized system, similar to Observed Second Scene 190 in FIG. 1D. The predicted second scene and the observed second scene may be compared. Differences between the predicted second scene and the observed second scene may be identified.

In some exemplary embodiments, based on the differences between the prediction and the observation, the model of Pile 220 may be corrected. In some cases, the model may be validated by the action in case there are no differences or in case the differences are explained by stochastic behavior of Environment 200, or other theoretical behavior of Environment 200.

In some exemplary embodiments, the stimuli force may be an ultrasonic vibration force. The ultrasonic vibration force may be a vibration force in high frequencies, such as for example, 20 kHz, 2 MHz, 200 MHz, 2 GHz, or the like. In some exemplary embodiments, in case of air propagation, the frequency may be set below about 5 GHz. Additionally or alternatively, propagation in solids may be set below about 1500 GHz. The ultrasonic vibration force may propagate through the structure of the target object. The predicted second scene may be an ultrasonic-like image, which may be compared to an outcome of an ultrasonic-like action. Waves caused by the ultrasonic vibration force may be expected to be diffracted from edges and boundaries of the physical objects, and hidden parts of the objects may be expected to be visualized. For example, given two physical objects that are connected with a screw, the screw may be detected in the observed scene due to diffraction of the ultrasonic waves, as an outcome of an ultrasonic scanning.

In some exemplary embodiments, an order of picking objects from Pile 220 may be determined based on the model of Pile 220, such as for example by determining an order of picking up objects in a manner that would not cause the objects of Pile 220 to disperse before being picked up. In some exemplary embodiments, a decision may be made for each physical object to be selected or not based on an amount of mechanical coupling of the physical object. The decision may be made based on the amount of mechanical coupling being above a predefined threshold. Additionally or alternatively, the decision may be made based on differences between the amount of mechanical coupling predicted in the predicted second scene and the amount of mechanical coupling counted in the observed second scene, i.e. after applying the stimuli force.

Additionally or alternatively, the decision may be made based on information related to differences determined between the predicted second scene and the observed second scene based on a direction of the vibration. An optimal direction of pulling an object may be determined. Pulling criteria for choosing an object may be determined. An object may be selected to be moved in each stage if the object passes the pulling criteria. Otherwise, another object candidate from Pile of Objects 220 may be searched until an object passes the pulling criteria.

In some exemplary embodiments, an object may be selected from Pile 220 and determined to be moved. An initial point and a destination point of the selected object may be determined. Robotic Arm 210 may pick up the selected object from the initial point and move it to the destination point while avoiding collision with other objects in Pile of Objects 220.

In other exemplary embodiments, the computerized system may be used to detect boundaries of objects in Environment 200. Such embodiments may be exemplified also using the illustrations of FIG. 2.

In some exemplary embodiments, observed boundary data of Object 222 may be missing, unclear, or the like, the computerized system may have difficulties to detect boundaries of Object 222 for several reasons, such as Object 222 may be partially obstructed from view of Sensors 230, the light conditions in Environment 200 may be poor or not uniform, or the like.

In some exemplary embodiments, predicting the predicted second scene of Environment 200 may comprise determining boundary data of Object 222 based on the first scene and using a model of Environment 200. In some exemplary embodiments, Robotic Arm 210 may apply a stimuli force on Object 222. In some exemplary embodiments, the stimuli force may be a vibration force. In some exemplary embodiments, a stimuli force may be determined to be applied on Object 222, similarly to the stimuli force applied on the target object as described above, before applying the stimuli.

In a similar manner as in the embodiment described above, a predicted second scene of Environment 200 may be predicted based on the first scene and using the model of Environment 200. The predicted second scene may illustrate how Environment 200 is expected to appear in response to applying the determined stimuli force.

After applying the stimuli force on Object 222, an observed second scene of Environment 200 may be obtained and compared with the predicted second scene. The comparison may comprise determining vibrating pixels in Object 222 boundary within the observed second scene. In some exemplary embodiments, Sensors 230 may be used to detect vibrating pixels associated with edges of Object 222.

In some exemplary embodiments, one or more visual frames may be captured by Sensors 230 during the time the system vibrates Object 222. The frames may be differentiated, pixel-wise, to determine a difference image. In some exemplary embodiments, if the view is static and the only change between frames is due to the vibration, the object contour may sharply be raised up in the difference image. The difference image, exemplifying the vibrating contour of Object 222, may be merged with the original boundary, as defined in the model, to produce a more correct and accurate boundary model of Object 222.

In some exemplary embodiments, a motion deletion process may be performed while observing the observed second scene. In some cases, during the time in which the stimuli force is applied, other objects may be in motion within the visual frames. Motion of other objects may generate false vibrating boundary pixels. A motion deletion process may be applied and information of motion of the other objects may be illuminated by removing the moving pixels of the other objects from the observed second scene. The information depicting motion of other objects may be extracted from the model of Environment 200.

Additionally or alternatively, the stimuli force may be synchronized with the observed second scene frame capture. In this case, the vibrating pixels may be cyclic while the motion pixels may not be cyclic.

Additionally or alternatively, the observed second scene may be captured for the same phase with an integration time period after applying the stimuli force. In this case, the motion pixels may be decreased.

In some exemplary embodiments, color of Object 222 may not be uniform, the texture or coloring of Object 222 may cause difference image to include also the body of Object 222. In some cases, all or most pixels in Object 222 may vibrate in response to the application of the stimuli force. Adjacent pixels outside Object 222 may not vibrate. Pixels inside Object 222 may have a difference and thus appear in the difference image. In some cases, the fully solid body of Object 222 may be identified based on the pixels that demonstrate a different value in different frames. The boundary may be computed based on the identified solid body. In some exemplary embodiments, such a process may produce accurate and precise results when the object coloring is not homogeneous and the standard visual system may fail to identify the object as one object because of such characteristic.

In some exemplary embodiments, Object 222 may be expanded according to the vibrating pixels detected in the observed second scene. The original boundary of Object 222 may fall inside the contour of the expanded version of Object 222. In some exemplary embodiments, Object 222 may appear to be fragmented to two or more sub-parts, such as for example when non-uniform light is projected on Object 222, when Object 222 is inside water and only the over water parts may be detected, when there is another object that hide Object 222 and may split Object 222 to several parts, or the like. A new vibration contour may be compared against a list of original objects and any of them that fit in to the vibrating element may be identified as a unified extended object. In some cases, the vibrating contour may be overlaid over the predicted second scene to identify the sub-parts of Object 222, which may erroneously been deemed as independent objects in the model of Environment 200.

In some exemplary embodiments, contour of Object 222 may be improved, such as for example when Object 222 is located in poor light, fog, haze, noisy environment, or the like. In case the contour of Object 222 is approximately in agreement with the vibrating contour, an average estimate of all contour points may be calculated. Boundaries of Object 222 may be detected based on the average estimate. In some exemplary embodiments, the boundary data of Object 222 in the predicted second scene and in the observed second scene may be compared. Boundaries of Object 222 may be determined based on the differences. In some exemplary embodiments, new boundary information may be combined to provide improved boundary data on Object 222.

Figure 3A:
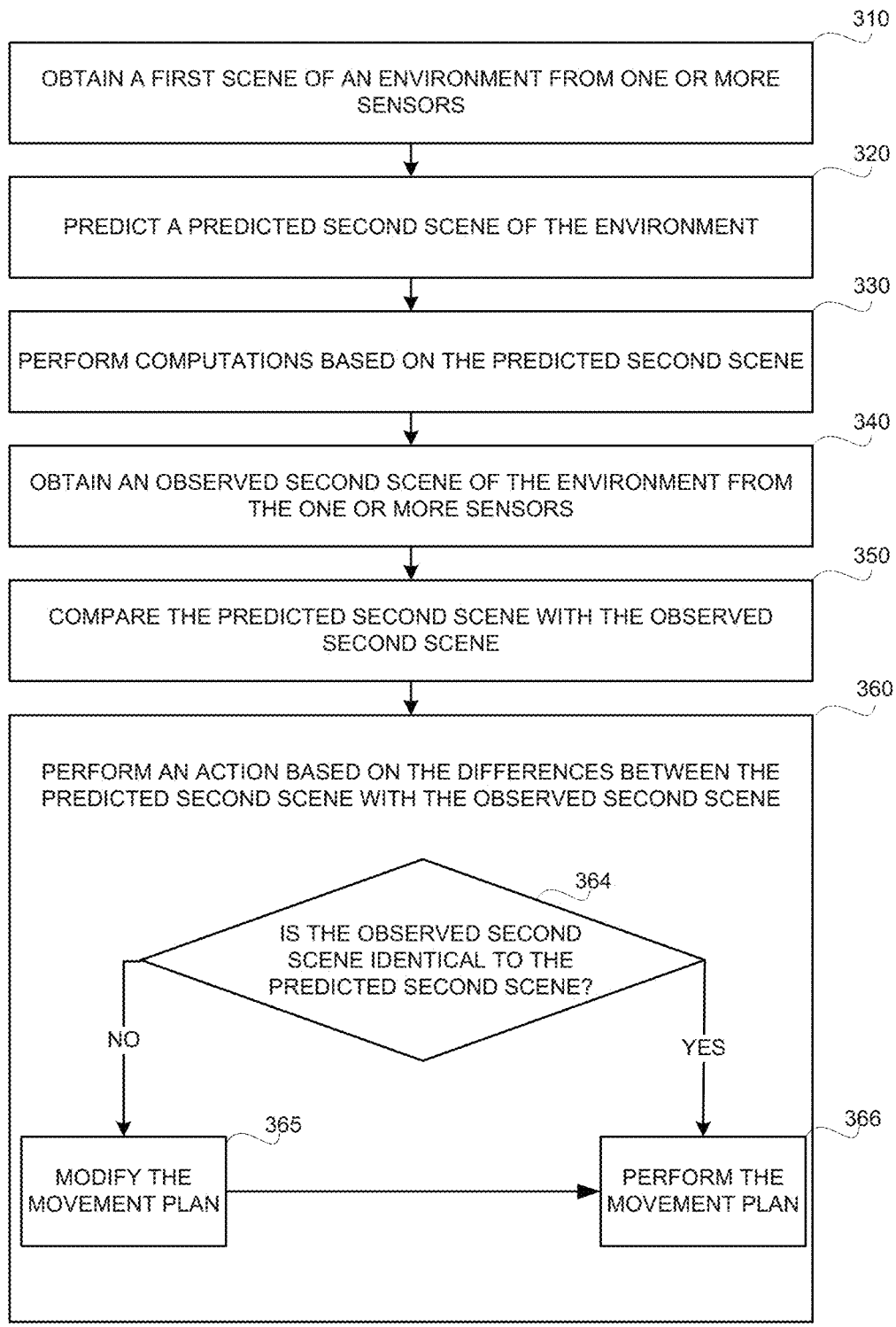
FIGS. 3A-3C show flowchart diagrams of methods, in accordance with some exemplary embodiments.

Referring now to FIG. 3A showing a flowchart diagram of a method in accordance with some exemplary embodiments of the disclosed subject matter.

In Step 310, a first scene of an environment may be obtained from one or more sensors. The one or more sensors observe scenes of the environment Information collected by the one or more sensors may be transmitted to computing devices connected, directly or indirectly, to the one or more sensors. The computing devices may analyze the information, process the information, store the information, or the like. Additionally or alternatively, the information collected by the one or more sensors may be uploaded to a server where it may be further processed and stored.

In some exemplary embodiments, the environment may be controlled by a computerized system. The computerized system may be utilized to receive, analyze and interpret images of a real scene of the environment. The computerized system may be configured to apply a decision making process using predefined criteria set by a user such as User 695 of FIG. 6, which may be based on the images. As an example, the computerized system may be utilized to automate go/no-go inspection decisions, assembly verification, part location, machine guidance, gaging/dimensional measurements, feedback control loops, or the like.

In Step 320, a predicted second scene of the environment may be predicted. The predicted second scene may be predicted based on the first scene of the environment. The predicted second scene may be predicted using a model of the environment. The model of the environment may model physical behavior of objects in the environment, such as speed, direction, moving pattern, or the like. The predicted second scene may be predicted by modifying data from the first scene based on the model of the environment. For example, if the first scene of the environment contains an object moving on a conveyor belt, the speed of the conveyor belt is a part of the environment model, the location of the object over time may be predicted. Additionally or alternatively, the model of the environment may contain information regarding stable objects within the environment. Additionally or alternatively, the model may include a model of objects existing in the environment, connections and relationships between objects, or the like.

In some exemplary embodiments, a prediction software may be used to predict the predicted second scene. The prediction software may be based on a prediction model of the environment. The prediction software may predict how the environment is expected to appear after a period of time, given a current scene of the environment. Additionally or alternatively, the prediction software may be configured to predict how the environment is expected to appear at the same time from a different angle or position, based on information derived from one or more scenes.

In Step 330, computations may be performed based on the predicted second scene. In some exemplary embodiments, the computations may be speculative computations which may assume that the information in the predicted second scene is correct and basing the computations thereon. Such computations may be performed prior to obtaining the obtained second scene itself. As an example, a scene may be obtained periodically, every ten seconds. Computations that may be useful for responding to the next scene may be performed based on the current scene and utilizing the prediction as to how the next scene is expected to appear.

In some exemplary embodiments, the computations may be computations of a movement plan of a robotic device. The robotic device may be utilized to modify the environment, to move objects within the environment, to add objects to the environment, to interact with objects in the environment, or the like. The movement plan may be computed so as to allow the robotic device to move in the environment, avoid collision with other entities or objects in the environment, and perform its designated function. The movement plan may be initially computed based on the predicted second scene, and deemed "an initial movement plan". The initial movement plan may be speculatively computed based on the assumption that the prediction of the predicted second scene is correct.

In Step 340, an observed second scene of the environment may be obtained from the one or more sensors.

In Step 350, the predicted second scene and the observed second scene may be compared. Given a reliable prediction model of the environment, the observed second scene and the predicted second scene may be identical or nearly identical in many instances. A reliable prediction model of the environment may predict the scene of the environment accurately and precisely, based on a given scene of the environment, by utilizing conditions of the environment, such as gravitation, wind, physics laws, trajectories of objects, or the like, to predict exact location of objects within the environment. Additionally, in man-made environments, such as a production floor, behavior of the environment may be predictable and pre-defined, and predictors may predict scenes of the environment with relatively high reliability.

Differences between the predicted second scene and the observed second scene may be determined. The differences may occur due to inaccuracy of the prediction, due to unexpected changes in the environment, or the like.

In Step 360, an action may be performed based on the differences determined between the predicted second scene and the observed second scene. In some exemplary embodiments, the computations computed based on predicted second scene, may be utilized to perform the action. Utilizing the computations may reduce the processing time after obtaining the observed second scene, by relying on the predicted second scene before obtaining the observed second scene, to perform computations needed for the action. The computations may be adjusted based on the differences determined between the predicted second scene and the observed second scene.

In some exemplary embodiments, the observed second scene and the predicted second scene may be compared (364). In case they are identical, the initial movement plan may be performed without a change (366). Alternatively, in case the two scenes are not identical, the movement plan may be modified according to the difference (365). In some exemplary embodiments, the modification may be localized to portions of the movement plan that are affected by the change so as to avoid re-computation of the movement plan from scratch and to allow re-use of at least some of the computations performed in advance (e.g., in Step 330). It will be noted that in some cases, differences between the predicted and the observed second scene may not affect the movement plan, and the initial movement plan may be used as-is.

In some exemplary embodiments, the modified movement plan may be performed (366).

In some exemplary embodiments, re-using all or some of the computations performed in Step 330 may reduce computation time required after obtaining the second scene. In some exemplary embodiments, response time of a computerized system may be reduced based on the utilization of speculative computations.

Figure 3B:
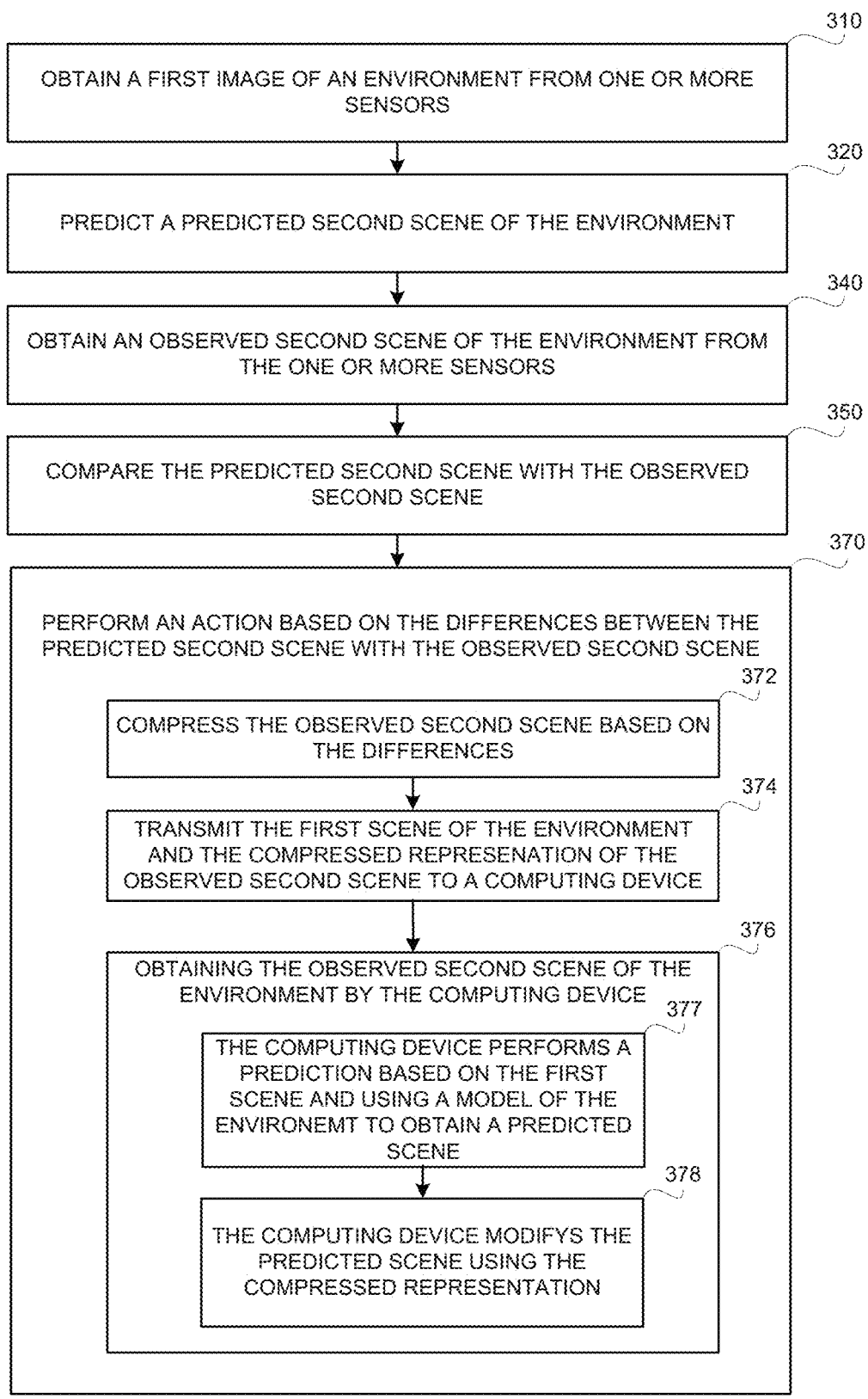

Referring now to FIG. 3B showing a flowchart diagram of a method in accordance with some exemplary embodiments of the disclosed subject matter.

In Step 370, based on the differences (350) between the observed second scene (340) and the predicted second scene (320) an action of compression may be performed.

In Step 372, the observed second scene may be compressed based on the differences between the observed second scene and the predicted second scene. A compressed representation of the observed second scene may be created, whereby the observed second scene may be obtainable from the compressed representation by a device capable of performing a prediction, using the model of the environment and based on the first scene. Using the model of the environment and based on the first scene, the device may predict a scene of the environment identical to the predicted second scene of the environment. By integrating the differences between the observed second scene and the predicted second scene in the scene, the device may obtain the observed second scene.

Parts of the observed second scene that match the predicted second scene, may not be needed to be included in the compressed representation, as they may be reconstructed by the device during un-compression. Only the differences between the observed second scene and the predicted second scene may be included in the compressed representation. In some exemplary embodiments, the differences between the predicted second scene and the observed second scene may be compressed using standard compression techniques, such as Null compression, Run-length compression, Keyword encoding. Adaptive Huffman coding, Lempel Ziv algorithms, or the like. The compressed differences may be stored or transmitted to other devices.

In some exemplary embodiments, the amount of differences found between the observed second scene and the predicted second scene may be negligible. As in many cases, small changes occur in the environment over time. For example, if the environment is a production floor containing a conveyor belt, most of the time, the background may not change. Only produced items moving on the conveyor belt may change. The movement of the produced items may usually be predicted as the assembly line of the production may be known, and other conditions of the environment model may be used. Differences may still be found due to unexpected changes, errors during the production, or the like.

In Step 374, the first scene of the environment and the compressed representation of the observed second scene may be transmitted to a computing device. The first scene of the environment and the compressed representation of the observed second scene may be transmitted through a computerized network. Additionally or alternatively, the first scene and the compressed representation may be stored in computer-readable medium to be later retrieved by the same device or by a different device.

In Step 376, the computing device may obtain the observed second scene based on the first scene of the environment and the compressed representation of the observed second scene.

In Step 377, the computing device may perform a prediction based on the first scene of the environment and using a model of the environment to predict a predicted scene of the environment. In some exemplary embodiments, the device may use the deterministic predicting software used in Step 320, to predict scenes of the environment given a single scene of the environment. Accordingly, the device may predict the predicted second scene given the first scene of the environment.

In step 378, the computing device may modify the predicted scene based on the compressed representation of the observed second scene. The compressed representation may contain only differences between the observed second scene and the predicted second scene. As the predicted scene and the predicted second scene are identical, modifying the predicted scene based on the differences may yield the observed second scene.

In some exemplary embodiments, the disclosed subject matter may be utilized to compress more than a single scene. In some exemplary embodiments, a chain of scenes may be compressed together. As an example, a chain of ten scenes may be stored or transmitted together. The first scene may be provided as is (or using some known compression methods). The second scene may be compressed and represented by the difference between the second scene and the predicted scene. Similarly, the third scene may also be compressed and represented by the difference between the third scene and its prediction, and so forth. In some cases, the prediction may be based on the first scene without correction. As an example, assuming $pred(s_1)$, provides a prediction of a next scene after $s_1$, the compression of $s_3$ may be based on the difference between $pred(pred(s_1))$ and between $s_3$. Additionally or alternatively, the compression may be based on the $s_2$ (e.g., $pred(s_2)$), which may be obtained by modifying pred$(s_1)$ according to the recorded differences.

Figure 3C:
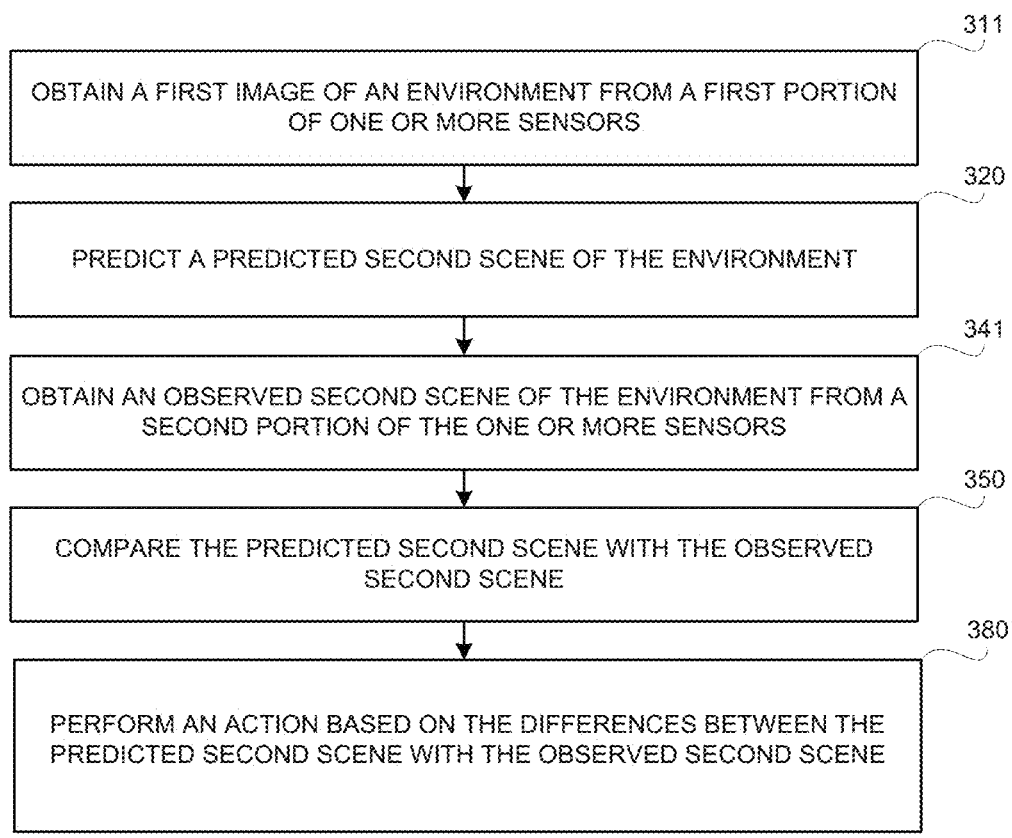

Referring now to FIG. 3C showing flowchart diagrams of methods in accordance with some exemplary embodiments of the disclosed subject matter.

In some exemplary embodiments, the first scene of the environment and the observed second scene of the environment may be observed by different portions of the one or more sensors. Different portions of the one or more sensors may be located in different locations within the environment. Additionally or alternatively, different portions of the one or more sensors may observe different locations within the environment.

In Step 311, a first scene of an environment may be obtained from a first portion of one or more sensors.

In Step 341, an observed second scene of the environment may be obtained from a second portion of the one or more sensors.

In some exemplary embodiments, the predicted second scene predicted in Step 320, may be a scene similar to scenes observed by the second portion of the one or more sensors. The predicted second scene may be predicted based on information captured by the first portion of the one or more sensors, and additional analytics based on the model of the environment.

In some exemplary embodiments, scenes of the environment observed by the first portion of the one or more sensors and the scenes of the environment observed by the second portion of one or more sensors may demonstrate different views of the environment. For example, the first portion of the one or more sensors may observe a first part of the environment, while the second portion of the one or more sensors may observe a second part of the environment. As another example, the first portion of the one or more sensors may observe the environment from a first angle, while the second portion of the one or more sensors may observe the environment from a different angle. Additionally or alternatively, each portion of the one or more sensors may provide different frames of the environment.

In some exemplary embodiments, the observed second scene may occur later in time than the first scene. The predicted second scene predicted in Step 320, may describe a scene of the environment at the same time as the observed second scene. The predicted second scene may describe how the environment is expected to appear later in time than the first scene from a different viewpoint. Using the model of the environment, such as speed of the conveyor belt, and the first scene observed by the first portion of the one or more sensors; the location over time of objects over the conveyor belt within the frame captured by the second portion of the one or more sensors may be calculated.

In some exemplary embodiments, the first scene and the observed second scene may occur at the same time. The predicted second scene predicted in Step 320, may describe a scene of the environment at the same time as the first scene, but in a different location of the environment, a different observation of the environment, a scene from a different viewpoint or the like. The predicted second scene may describe how the environment is expected to appear from a different viewpoint. The predicted second scene may be predicted based on the first scene and using information known from the model of the environment. As a non-limiting example, describing a situation of the first and the second portions of the one or more sensors, observing the environment comprising a conveyor belt with objects moving on in different locations, while the second portion of the one or more sensors may observe a downstream frame of the environment from the first portion of the one or more sensors. Using the model, it may be known which information is extractable from the first scene that can be interpolated over to the second scene, such as for example, lighting conditions, textures and colors of portions of shapes that appear in both viewpoints, or the like.

In some exemplary embodiments, the disclosed subject matter may be utilized to utilize one or more obtained scenes to predict a plurality of other scenes, some of which may occur simultaneously as the obtained scenes and some of which may be predicted to occur in a later time.

Figure 4:
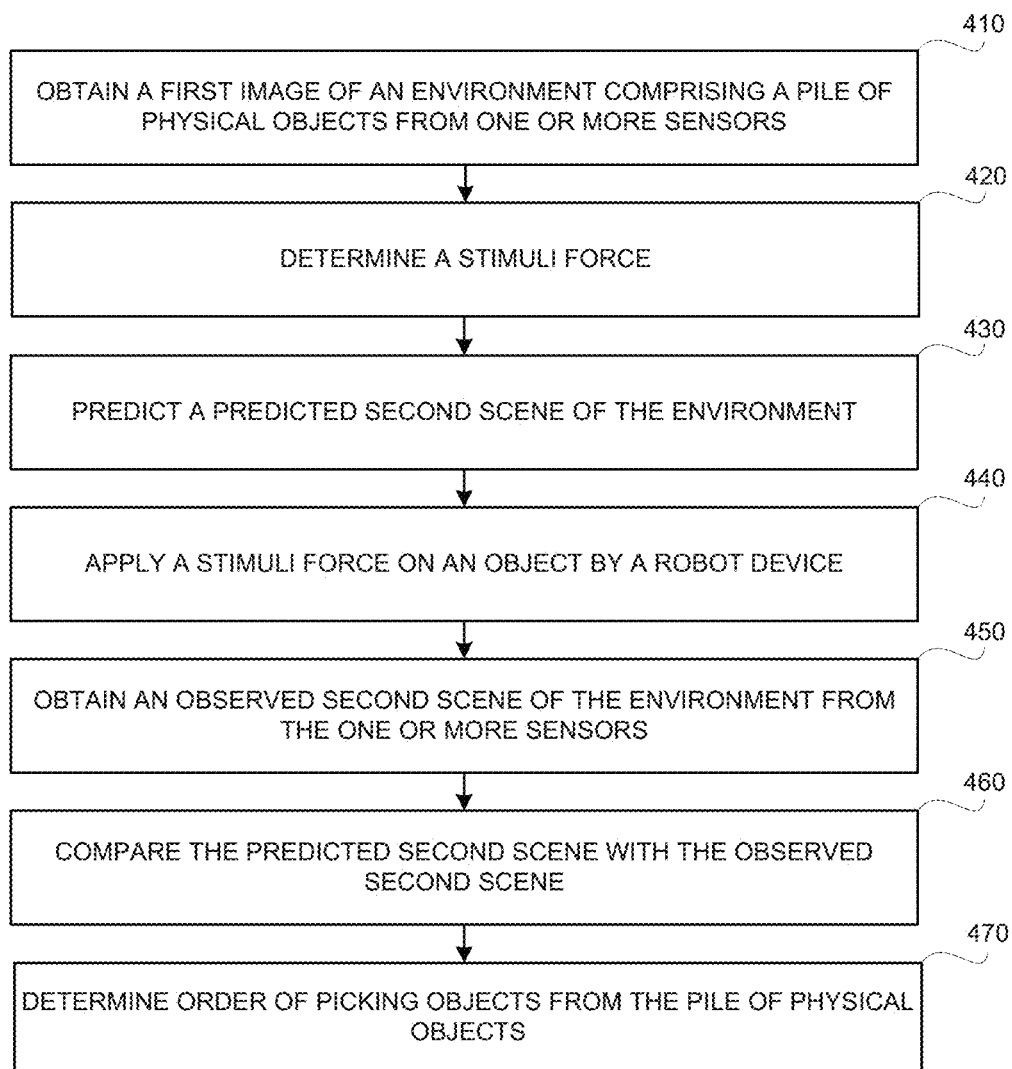
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In Step 410, a first scene of an environment may be obtained from one or more sensors. In some exemplary embodiments, the environment may comprise a pile of physical objects. A composition of the pile may depend on properties of the physical objects, such as weight, surface, shape, or the like; as well as their inter-connectivity, mechanical coupling therebetween; or the like.

In some exemplary embodiments, an initial model of the pile may be available. The initial model may be extracted from the first scene, from previous observed scenes, from previous modeling attempts, from the user, or from any other source. The initial model may comprise a list of the physical objects in the pile, an arrangement of the physical objects in the pile, a 3D pile model, information regarding the physical objects in the pile, inter-connectivity information, or the like.

In Step 420, a stimuli force may be determined to be applied on an object of the physical objects in the pile. In some exemplary embodiments, factors of the stimuli force, such as direction, strength, magnitude, vibration frequency, or the like may be planned based on the initial model of the pile.

In some exemplary embodiments, the object upon which the stimulus is to be applied may be selected based on the initial model of the pile. For example, the least connected object may be selected. The stimuli force may be designed to be applied on the object to derive information about location of the physical objects in the pile, its connectivity to other objects in the pile, or the like.

In some exemplary embodiments, an intensity of the stimuli force may be below a maximal threshold of an intensity capable of changing a structure of the pile of physical objects; and above a minimal threshold of an intensity capable of moving the object in a manner detectable by the one or more sensors.

In some exemplary embodiments, the stimuli force may be a vibration force. The vibration force may be applied in one or more directions.

In Step 430, a predicted second scene of the environment may be predicted. The predicted second scene may be predicted based on the first scene of the environment and using the initial model of the pile. In some exemplary embodiments, the predicted second scene may depict how the pile is expected to appear in response to applying the stimuli force. In some exemplary embodiments, there may be a series of predictions, such as predicting several scenes in response to a vibration stimuli force.

In Step 440, the stimuli force may be applied on the object. The stimuli force may be applied by a robotic device capable of physically interacting with objects in the environment.

Additionally or alternatively, multiple robotic devices may be used to stimulate other physical objects in the pile. In some exemplary embodiments, some or all of the robotic devices may also be used for sensing the outcome of the application of the stimuli, such as sensing vibrations induced on objects in response to the stimuli force.

In some exemplary embodiments, the stimuli force may be applied using another elements in the environment, and not necessarily a robotic device. For example, if the pile of physical objects is positioned on a conveyor belt, the stimuli force may be applied by accelerating or decelerating the speed of the conveyor belt. As another non-limiting examples, the stimuli force may be applied by a vibrating plate that the pile of physical objects may be located over, by blowing a wind over the pile of physical objects, or the like.

In Step 450, an observed second scene of the environment may be obtained from the one or more sensors.

In Step 460, the predicted second scene and the observed second scene may be compared. In some exemplary embodiments, based on the comparison, the model may be updated. In some exemplary embodiments, the observed second scene may be used to update the model of the pile. The updated model may be updated comparing with the initial model of the pile, due to changes in the pile of physical objects as a result of applying the stimuli force. Additionally or alternatively, the updated model may be updated due to the substantial observation of the environment. Additionally or alternatively, a strength of an induced vibration of other physical objects in the pile may be measured. The induced vibration may be measured by visual means using one or more cameras, ultrasonic sensors that detect movement of objects and measure the distance to the objects, or the like. Based on such measurements, the model may be updated. In some cases, application of stimuli in one direction may be used to obtain a second scene while application of stimuli in another direction may be used to obtain yet another scene. Both obtained scenes may be used to update the model, as each such scene may be useful in extracting information regarding mechanical coupling in different directions, between different objects in the pile, or the like.

In Step 470, an order of picking objects from the pile of physical objects may be determined. The order may be determined based on the model, such as by selecting objects that are least connected object first and the most connected object last.

In some exemplary embodiments, the object selected to be picked may be selected based on the mechanical coupling between the selected object and the surrounding physical objects in the pile. The selected object may be selected if amount of mechanical coupling between the selected object and the surrounding physical objects in the pile is less than a predetermined threshold, if the selected object is an object on the outer surface of the pile of physical objects with the least amount of mechanical coupling between the target object and the surrounding physical objects in the pile, or the like.

In some exemplary embodiments, the order may be determined in advance, however at any given point additional investigation actions may be performed so as to refine the model and potentially change the initial plan, such as by applying additional stimuli forces and determining their effects on the pile.

In some exemplary embodiments, Steps 420 to 470 may be repeated in order to generate an object picking list to be executed. Additionally or alternatively, if the validity of the updated model is not sufficient and there are conflicts between the estimated behavior according to the predicted second scene and the actual readings presented in the observed second scene, additional stimuli force may be applied until the level of confidence in the updated model is sufficient, e.g., above a predetermined threshold.

Figure 5:
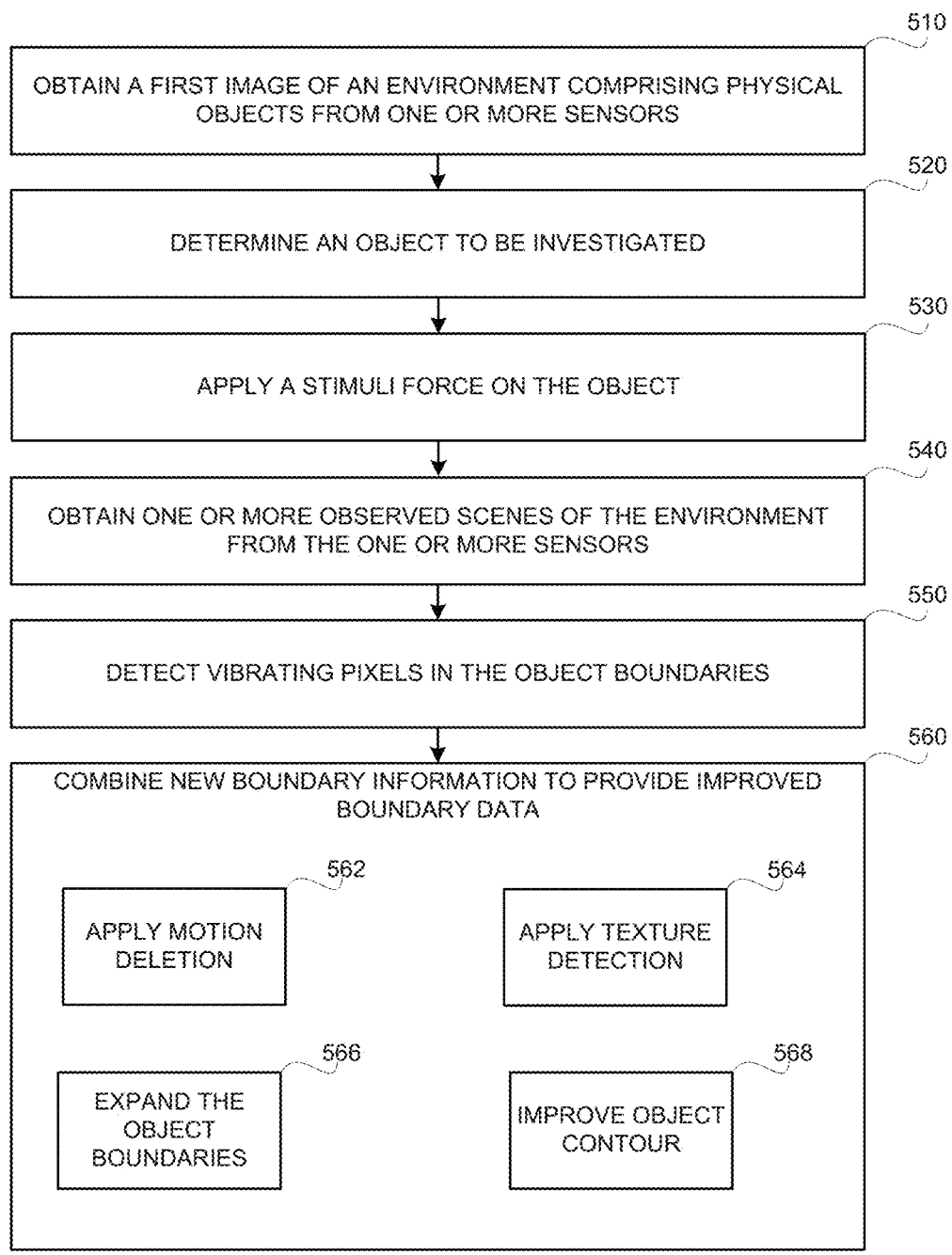
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

In Step 510, a first scene of an environment may be obtained from one or more sensors. In some exemplary embodiments, the environment may comprise one or more physical objects. In some exemplary embodiments, a robotic device may perform actions on the one or more physical objects within the environment.

In Step 520, an object may be selected from the one or more physical objects to investigate its boundaries. In some exemplary embodiments, the first scene of the environment may comprise partial boundary data of the object, may be missing boundary data of the object, or the like. In some exemplary embodiments, boundary data may be extracted from the first scene, from previously obtained scenes, from the user, or the like. In some exemplary embodiments, a model of the environment may comprise boundary data of the selected object.

In some exemplary embodiments, a robotic component may be used to vibrate the desired object. Boundaries of the object may be detected by detecting vibrating pixels associated with the edge of the vibrating object. Information about the object obtained by the computerized system may be combined with the boundary information to provide improved boundary data on the object. Accordingly, the selected object may be selected based on the system being able to apply stimuli thereon and to extract boundary information consequently.

In Step 530, a stimuli force may be applied on the object. The stimuli force may be similar to the stimuli force determined in Step 420 of FIG. 4. The stimuli force may be applied by the robotic device. The stimuli force may be applied similarly to Step 440 in FIG. 4.

In some exemplary embodiments, the stimuli force may be a vibration force. A frequency of the vibration may be less than a maximal threshold of a frame capture rate of the one or more sensors, such as 10 Hertz, 20 Hertz, 50 Hertz, 100 Hertz, or the like. Additionally or alternatively, the frequency of the vibration may be above a sampling rate of the sensors and correlated thereto, such as twice the sampling rate, ten times the sampling rate, or the like.

In some exemplary embodiments, the stimuli force applied on the selected object may generate an induced vibration of the selected object and/or of other objects in the environment adjoining the selected object. The induced vibration may be visually detected by the one or more sensors or by other sensors of the computerized system observing the environment. The visual detection of the induced vibration may be limited by the optical resolution of the one or more sensors. In some exemplary embodiments, the frequency of the vibration force may be above a minimal threshold capable of generating an amplitude of the induce vibration above an amplitude minimal threshold such as one pixel, two pixels, 5 pixels, 20 pixels, or the like. It will be noted that in some embodiments the threshold may depend upon the resolution of the sensors.

In Step 540, one or more observed scenes of the environment may be obtained from the one or more sensors. In some exemplary embodiments, the one or more observed scenes may be captured by the one or more sensors simultaneously with applying the stimuli force on the object. Additionally or alternatively, the one or more observed scenes may be captured after applying the stimuli force on the object.

In Step 550, vibrating pixels may be detected in the one or more observed scenes. The vibrating pixels may indicate boundaries of the object. In some exemplary embodiments, different pixels associated with the object may vibrate in different observed scenes of the one or more observed scenes.

In some exemplary embodiments, the one or more observed scenes may be compared in order to obtain information about the boundaries of the object. Vibrating pixels within different observed scenes may be compared. Boundary data of the object may be compared between the one or more observed scenes. In some exemplary embodiments, vibrating pixels in the object boundaries may be determined within the one or more observed second scene based on the comparison.

In some exemplary embodiments, the one or more observed scenes may be differentiated, pixel-wise, to determine a difference image. In some exemplary embodiments, if according to the comparison between the one or more observed scenes, the view is static and the only change is due to applying the stimuli force, the object contour may be displayed in the difference image.

In Step 560, new boundary information from the one or more observed scenes may be combined to provide improved boundary data. In some exemplary embodiments, the vibrating contour of the object exemplified in the difference image may be merged with the original boundary as defined in the model, to produce a more accurate boundary data of the object. Additionally or alternatively, the boundary information may be used to validate an a-priori boundary information the system may have of the object, such as in case the vibration appears to present a same boundary information as was previously modeled by the system.

In Step 562, motion deletion process may be applied. In some cases, during the time in which the stimuli force is applied, other objects may be in motion within one or more observed scenes. Motion of other objects may generate false vibrating boundary pixels. A motion deletion process may be applied and information of motion of the other objects may be illuminated by removing the moving pixels of the other objects from the one or more observed scenes. In some exemplary embodiments, the motion deletion process may utilize a model of the environment which may be used to predict movement of elements in the environment. Based on such prediction, effects of the predicted motion may be addressed and ignored.

In some exemplary embodiments, the frequency of the vibration stimuli may be synchronized with the one or more observed scenes frame capture. The frequency may be of a frame capture rate of the one or more sensor or multiple thereof, such that the stimuli force may be applied in a synchronized manner with a capture timing of the one or more sensors. In such a case, pixels in the difference image may be categorized to two different types: vibrating pixels which appear as a result of the stimuli force and moving pixels which appear in view of a movement that is external to the stimuli force (e.g., movement of a conveyer belt in the environment). In some exemplary embodiments, vibrating pixels may occur in cycles in difference images over time (i.e., appear cyclically), while the moving pixels, that move regardless of the stimuli force, may occur in a non-cyclic manner.

In some exemplary embodiments, moving pixels may be detected and ignored automatically. One way to eliminate the moving pixels may be to capture plurality of observed scenes for the same phase before applying the stimuli force. Pixels in difference images computed based on such scenes are by definition moving pixels. Based on such computation, pixels in difference images that are based on scenes after the stimuli force is applied may be filtered to remove pixels that correspond to the moving pixels in the pre-vibration stage.

In some exemplary embodiments, the vibration frequency and timing may be synchronized to the sampling rate of the sensor, e.g., image frame capture. In some exemplary embodiments, the sampling rate may be a multiplication of the vibration rate or vise versa. As an example, the sampling rate may be twice the vibration rate so each pixel may have two minimal values but the background may not appear to move and accordingly no changing pattern may be present in the obtained scenes. In some exemplary embodiments, the vibrating pixels may appear cyclically while the motion pixels may not appear cyclically. Same phase observed scenes may be aggregated together before the difference operation may decrease the number of motion pixels. In some cases, if sufficient integration time is applied, any moving objects may be completely or partially wiped out from the difference image being analyzed. For example, applying abs(diff( )) function and integrating the background over several samples may result in the background receiving low readings and the vibrated object pixel having accumulated high readings. Such computation may be useful for distinguishing between vibrating pixels and background pixels.

In Step 564, texture detection process may be applied.

In some exemplary embodiments, the texture or coloring of the object may cause the difference image to include also the body of the object. Internal pixels of the object may be identified as they may appear differently in the one or more observed scenes. The fully solid body of the object may be identified based on the pixels that demonstrate a different value in different observed scenes of the one or more scenes. The boundary may be computed based on the identified solid body.

In Step 566, the boundary of the object may be expanded to comprise several elements. In some exemplary embodiments, the object may appear to be fragmented into two or more parts and may be initially modeled as such. In some exemplary embodiments, as the object is a single object, the two or more parts may vibrate simultaneously. Vibrating pixels may be identified as a unified extended object, and as a result it may be determined that the boundary of the object includes the two or more parts (e.g., the first part may be expanded to include the remaining parts). Based on such determination, the model of the objects may be updated and improved.

In Step 568, the object contour, as depicted in an initial model, may be improved. An average estimate of all contour points in the one or more observed scenes may be calculated. Boundaries of the object may be computed based on the average estimate.

Figure 6:
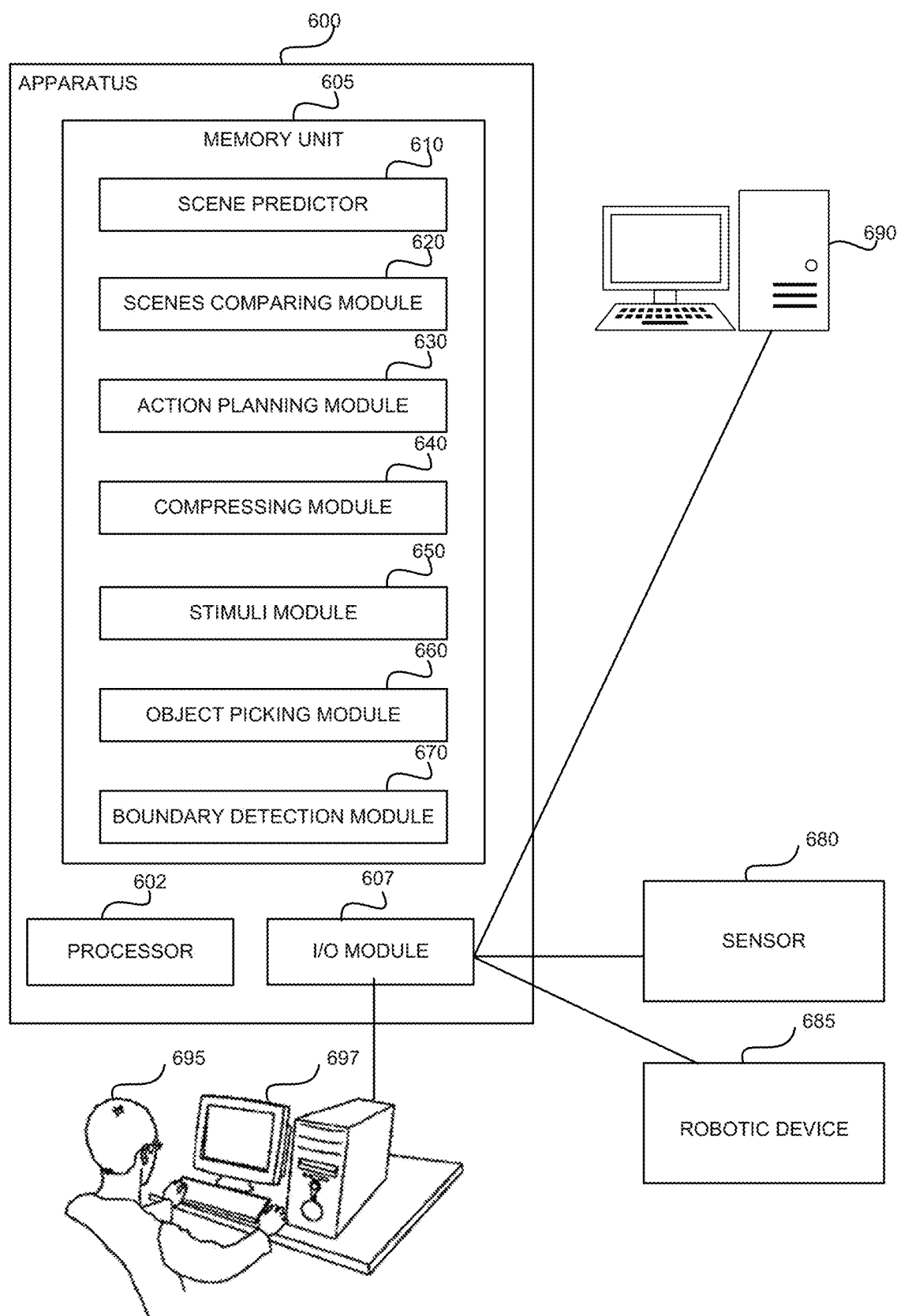
FIG. 6 shows a block diagram of an apparatus, in accordance with some exemplary embodiments of the disclosed subject matter.

Referring now to FIG. 6 showing a block diagram of components of an apparatus, in accordance with some exemplary embodiments of the disclosed subject matter. An Apparatus 600 may be a computerized apparatus adapted to perform methods such as depicted in FIGS. 3A-3C, 4 and 5, or the like.

In some exemplary embodiments, Apparatus 600 may comprise a Processor 602. Processor 602 may be a Central Processing Unit (CPU), a microprocessor, an electronic circuit, an Integrated Circuit (IC) or the like. Additionally or alternatively, Apparatus 600 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 602 may be utilized to perform computations required by Apparatus 600 or any of its subcomponents.

In some exemplary embodiments of the disclosed subject matter, Apparatus 600 may comprise an Input/Output (I/O) Module 607. Apparatus 600 may utilize I/O Module 607 as an interface to transmit and/or receive information and instructions between Apparatus 600 and external V/O devices, such as a Sensor 680, a Robotic Device 685, the Internet, a Workstation 697, a Computerized Device 690, or the like.

In some exemplary embodiments, I/O Module 607 may be used to provide an interface to a User 695 of the system, such as by providing output, images, scenes of an environment, visualized results, reports, or the like. User 695 may use Workstation 697 to input the information to be encoded. It will be appreciated that Apparatus 600 can operate without human operation.

In some exemplary embodiments, Sensor 680 may be a visual sensor, such as a digital camera, a video camera, a photoelectric sensor, a line scan camera, a three dimensional vision sensor, or the like. In some exemplary embodiments, Sensor 680 may be a non-visual sensor, such as ultrasonic sensor, a haptic sensor, a piezoelectric sensor, or the like. Sensor 680 may be used to observe an environment, such as 100 in FIG. 1A. Sensor 680 may collect data of the environment and transmit it to Apparatus 600 via I/O Module 607. The collected data may be a digital representation of the environment. In some exemplary embodiments, images of scenes of the environment may be obtained from Sensor 680. Additionally or alternatively, video frames of scenes of the environment may be obtained from Sensor 680.

In some exemplary embodiments, compressed representations of scenes of the environment may be transmitted by Apparatus 600, via 1/O Module 607, to Computing device 690. Computing device 690 may decompress compressed representations of scenes of the environment, store compressed representations of scenes of the environment, or the like. In some exemplary embodiments, in order to decompress the representation, Computing Device 690 may utilize a scene predictor, such as 610 which is utilized by Apparatus 600.

In some exemplary embodiments, Apparatus 600 may comprise a Memory Unit 605. Memory Unit 605 may be persistent or volatile. For example, Memory Unit 605 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 605 may retain program code to activate Processor 602 to perform acts associated with any of the steps shown in FIGS. 3A-3C, 4, and 5. Memory Unit 605 may also be used to retain compressed representations of scenes of environments observed by Sensor 680 (not shown), images of environments observed by Sensor 680 (not shown), information to encode (not shown), a digital model of the environment (not shown), a digital model of boundaries of an object (not shown), or the like.

In some exemplary embodiments, a Scene Predictor 610 may be used to predict scenes of an environment observed by Sensor 680. Scene Predictor 610 may be utilized to predict predicted scenes of the environment based on an observed scene of the environment and using a model of the environment. In some exemplary embodiments, Scene Predictor 610 may use a prediction software to predict predicted scenes of the environment. In some exemplary embodiments, Scene Predictor 610 may provide deterministic predictions. In some exemplary embodiments, Scene Predictor 610 may provide a prediction based on a history of scenes, such as scenes observed and retained in a database which may depict normal expected operation. In some exemplary embodiments, the database may retain information about chains of scenes, and once an observed scene is identified in a chain, a next scene may be predicted based on a successive scene in the chain. In some exemplary embodiments, a plurality of chains may match an observed scene, and the successive scene may be determined as an interpolation or other manipulation on all potential successive scenes thereof. Additionally or alternatively, each potential successive scene may be regarded as a different potential alternative scene. Additionally or alternatively, a chain of observed scenes may be observed and used to identify a matching chain of scenes to be used as a basis for prediction.

In some exemplary embodiments, a Scenes Comparing Module 620 may be used to compare predicted scenes of the environment, predicted by Scene Predictor 610, with observed scenes of the environment obtained from Sensor 680. Scenes Comparing Module 620 may be utilized to find differences between a predicted scene and an observed scene of an environment.

In some exemplary embodiments, an Action Planning Module 630 may be used to plan actions based on predicted scenes, predicted by Scene Predictor 610. Action Planning Module 630 may be utilized to perform speculative computations based on a predicted scene. Action Planning Module 630 may utilize computations to prepare for an initial movement plan for Robotic Device 685. Action Planning Module 630 may be utilized to adjust the initial movement plan based on differences determined by Scenes Comparing Module 620 between the predicted scene and an observed scene.

In some exemplary embodiments, a Compressing Module 640 may be used to compress scenes of the environment. Compressing Module 640 may compress scenes of the environment based on differences determined by Scene Comparing Module 620 between predicted scenes and observed scenes of the environment. Compressed versions of scenes of the environment produced by Compressing Module 640 may be transmitted to Computerized Device 690 by I/O Module 607. In some exemplary embodiments, Computerized Device 690 may be utilized to de-compress compressed versions of the environment created by Compressing Module 640 using the model of the environment and a first scene of the environment. In some exemplary embodiments, Computerized Device 690 may retain the model and retain a Scene Predictor 610 thereby allowing Computerized Device 690 to perform the same predictions as Apparatus 600.

In some exemplary embodiments, a Stimuli Force Module 650 may be used to determine a stimuli force to be applied on an object from the environment depicted in the scenes obtained from Sensor 680. Stimuli Force Module 650 may be utilized to plan factors of the stimuli force, such as direction, strength, magnitude, vibration frequency, or the like. In some exemplary embodiments, the stimuli force determined by Stimuli Force Module 650 may be applied on the object, such as by Robotic Device 685, one or more other robotic devices, other elements in the environment, or the like.

In some exemplary embodiments, the environment depicted by the scenes obtained from Sensor 680 may comprise a pile of physical objects. An initial model of the pile may be available, extracted from data collected by Sensor 680, obtained from User 695, or the like. In some exemplary embodiments, Object Picking Module 660 may be used to determine an order of picking objects from the pile of physical objects. Object Picking Module 660 may determine the order based on an updated model of the pile. The updated model of the pile may be generated after applying a stimuli force on an object of the pile. In some exemplary embodiments. Stimuli Force Module 650 may be used to determine the stimuli force and the object upon which the stimuli are to be applied. Stimuli Force Module 650 may select the object and determine the stimuli force based on the initial model of the pile. In some exemplary embodiments, Scene Comparing Module 620 may be used to compare a predicted scene of the environment and an observed scene of the environment. The updated model of the pile may be determined based on the comparison. In some exemplary embodiments, Scene Predictor 610 may be used to predict the predicted scene of the environment based on a previously observed scene of the environment and using the initial model of the pile. The predicted scene may depict how the pile is expected to appear in response to applying the stimuli force. In some exemplary embodiments, the observed scene may be obtained from Sensor 680 after applying the stimuli force.

In some exemplary embodiments, a Boundary Detection Module 670 may be used to detect boundaries of objects within the environment observed by Sensor 680.

In some exemplary embodiments, Robotic Device 685 may be used to vibrate an object from the environment to investigate its boundaries. A frequency of the vibration may be determined by Stimuli Force Module 650. Boundary Detection Module 670 may detect boundaries of the object by detecting vibrating pixels associated with the edge of the vibrating object in difference images computed based on scenes obtained from Sensor 680. In some exemplary embodiments, one or more scenes of the environment may be captured by Sensor 680 simultaneously with applying the stimuli force on the object, after applying the stimuli force on the object, a combination thereof, or the like. Boundary Detection Module 670 may be used to detect the vibrating pixels in the one or more observed scenes in order to detect boundaries of the object.

In some exemplary embodiments, Scene Comparison Module 620 may be used to compare the one or more observed scenes in order to obtain information about the boundaries of the object. Scene Comparison Module 620 may be used to compare vibrating pixels between different observed scenes, boundary data of the object in the one or more observed scenes, or the like. Additionally or alternatively, Scene Comparison Module 620 may be used to determine a difference image of the one or more observed scenes based on a pixel-wise comparison between the one or more observed scenes.

In some exemplary embodiments, Boundary Detection Module 670 may combine boundary data of the objects observed by Sensor 680 with new boundary information to provide improved boundary data.

In some exemplary embodiments, Boundary Detection Module 670 may detect other objects that may be in motion within one or more observed scenes during the time in which the stimuli force is applied; and eliminate the motion by removing the moving pixels of the other objects from the one or more observed scenes. Additionally or alternatively, Boundary Detection Module 670 may expand the boundary of the object to comprise several elements, improve the object contour, as depicted in an initial model to detect the boundaries of the object, or the like. The components detailed above may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   one or more sensors configured to capture scenes of an environment, the environment comprises one or more physical objects;
   a processor configured to:
   obtain a computer-representation of a first scene of the environment from said one or more sensors;
   predict, using a model of the environment and based on the computer-representation of the first scene of the environment, a predicted second scene of the environment, the predicted second scene comprises predicted pixel values;
   obtain a computer-representation of a second observed second scene of the environment from said one or more sensors, the observed second scene comprises observed pixel values;
   determine a difference between the predicted second scene and the observed second scene based on different values of the predicted pixel values compared to the observed pixel values; and
   create a compressed computer-representation of the observed second scene, wherein the compressed computer-representation includes the determined difference between the predicted second scene and the observed second scene, thereby the computer-representation of the observed second scene can be reconstructed by predicting, using the model and the computer-representation of the first scene, the predicted second scene, and by applying the determined difference between the predicted second scene and the computer representation of the observed second scene.

2. The system of claim 1, wherein the observed second scene occurs later in time than the first scene.

3. The system of claim 1, further comprising a storage device for storing the compressed computer-representation of the observed second scene, wherein the processor is further configured to store the compressed computer-representation of the observed second scene in the storage device, and to uncompress the compressed computer-representation of the observed second scene by applying the determined difference between the predicted second scene and the computer-representation of the observed second scene on the predicted second scene.

4. The system of claim 1, further comprising:
a computing device and
a communication module configured to transmit the computer-representation of the first scene and the compressed computer-representation of the observed second scene to the computing device;
wherein said computing device is configured to uncompress the compressed computer-representation of the observed second scene to obtain the computer-representation of the observed second scene by: predicting, using the model of the environment, a predicted scene of the environment based on the computer-representation of the first scene and by modifying the predicted scene using the determined difference between the predicted second scene and the observed second scene to reconstruct the computer-representation of the observed second scene.

5. The system of claim 1, wherein the computer-representation of the first scene is obtained from a first portion of the one or more sensors; wherein the computer-representation of the observed second scene is obtained from a second portion of the one or more sensors, and wherein the first portion and the second portion of the one or more sensors are different.

6. The system of claim 5, wherein scenes of the environment observed by the first portion of the one or more sensors and scenes of the environment observed by the second portion of one or more sensors demonstrate different views of a same location in the environment.

7. The system of claim 6, wherein the first scene and the observed second scene occur at a same time.

8. The system of claim 1, wherein the one or more sensors include one or more cameras, wherein scenes obtained from the one or more sensors include images of the environment, wherein the compressed computer-representation is a compressed representation of an image of the observed second scene.

9. The system of claim 1, wherein said processor is configured to utilize a machine-learning-based predictor in order to predict the predicted second scene, wherein the machine-learning based predictor is trained based on scenes of the environment that were captured by the one or more sensors.

10. The system of claim 1, wherein the environment is a production environment, wherein the one or more physical objects are articles manufactured in the production environment.

11. A method comprising:
obtaining a computer-representation of a first scene of an environment from one or more sensors, the environment comprises one or more physical objects, the one or more sensors are configured to capture scenes of the environment;
predicting, using a model of the environment and based on the computer-representation of the first scene of the environment, a predicted second scene of the environment, the predicted second scene comprises predicted pixel values;
obtaining a computer-representation of an observed second scene of the environment from the one or more sensors, the observed second scene comprises observed pixel values;
determining a difference between the predicted second scene and the observed second scene based on different values of the predicted pixel values compared to the observed pixel values; and
creating a compressed computer-representation of the observed second scene, wherein the compressed computer-representation includes the determined difference between the predicted second scene and the observed second scene, thereby the computer-representation of the observed second scene can be reconstructed by predicting, using the model and the computer representation of the first scene, the predicted second scene, and by applying the determined difference between the predicted second scene and the computer-representation of the observed second scene.

12. The method of claim 11, wherein the compressed computer-representation of the observed second scene includes information useful for transforming the predicted second scene into the observed second scene.

13. The method of claim 11, wherein a device can reconstruct the computer-representation of the observed second scene by predicting, using the model and based on the computer-representation of the first scene, the predicted second scene, and by manipulating the predicted second scene using the determined difference between the predicted second scene and the observed second scene from the compressed computer-representation.

14. The method of claim 11 further comprises storing the compressed computer-representation in a storage device.

15. The method of claim 11 further comprises transmitting the computer-representation of the first scene and the compressed computer-representation to a remote device, the remote device is configured to reconstruct the computer-representation of the observed second scene by: predicting, using the model of the environment, a predicted scene of the environment based on the computer-representation of the first scene and by modifying the predicted scene using the determined difference between the predicted second scene and the observed second scene to reconstruct the computer-representation of the observed second scene.

16. The method of claim 11, wherein said predicting is performed using a deterministic machine-learning based predictor, whereby compression and uncompression are performed while relying on identical predictions by the deterministic machine-learning based predictor given identical input, whereby the difference between the predicted second scene and the observed second scene is consistent for different predictions performed using the deterministic machine-learning based predictor.

17. A method for uncompressing scene information from a compressed computer-representation of an observed scene, the method comprising:
obtaining a computer-representation of a base scene, wherein the base scene and the observed scene are scenes captured by one or more sensors or portion thereof, the one or more sensors are configured to capture scenes of an environment, and the environment comprises one or more physical objects;
predicting, using a model of the environment and based on the computer representation of the base scene of the environment, a predicted scene of the environment, the predicted scene comprises predicted pixel values; and obtaining from the compressed computer-representation a determined difference between the predicted scene and the observed scene, the determined difference is based on different values of the predicted pixel values and observed pixel values of the computer-representation of the observed scene;

modifying the predicted scene of the environment based on the determined difference between the predicted scene and the observed scene to reconstruct the computer-representation of the observed scene.

18. The method of claim 17, wherein the compressed computer-representation of the observed scene was generated using the predicted scene of the environment, which was obtained using the model of the environment and the computer-representation of the base scene.

19. The method of claim 17 further comprises: receiving transmission of the compressed computer-representation over a network; wherein said obtaining of the computer-representation of the base scene includes receiving transmission of the computer-representation of the base scene over the network, thereby reducing utilized bandwidth for the transmission of the computer-representation of the observed scene.

20. The system of claim 1, wherein the compressed computer-representation excludes parts of the observed second scene that match the predicted second scene.

21. The system of claim 1, wherein the compressed computer-representation consists only of the determined difference between the predicted second scene and the observed second scene.

* * * * *